US012717050B2

(12) United States Patent
Iniewski et al.

(10) Patent No.: US 12,717,050 B2
(45) Date of Patent: Aug. 25, 2026

(54) DIRECT ATTACH RADIATION DETECTOR STRUCTURES HAVING REDUCED CROSS-TALK

(71) Applicant: REDLEN TECHNOLOGIES, INC., Saanichton (CA)

(72) Inventors: Krzysztof Iniewski, Port Moody (CA); Michael K. Jackson, Victoria (CA); Yuxin Song, Saanichton (CA)

(73) Assignee: REDLEN TECHNOLOGIES, INC., Saanichton (CA)

( * ) Notice: Subject to any disclaimer, the term of this patent is extended or adjusted under 35 U.S.C. 154(b) by 175 days.

(21) Appl. No.: 18/612,350

(22) Filed: Mar. 21, 2024

(65) Prior Publication Data

US 2024/0418877 A1 Dec. 19, 2024

Related U.S. Application Data

(60) Provisional application No. 63/508,944, filed on Jun. 19, 2023.

(51) Int. Cl.

| | |
|---|---|
| ***G01T 1/00*** | (2006.01) |
| ***G01N 23/00*** | (2006.01) |
| ***G01N 23/046*** | (2018.01) |
| ***G01N 23/083*** | (2018.01) |
| ***G01T 1/24*** | (2006.01) |

(52) U.S. Cl.

CPC ........... *G01T 1/247* (2013.01); *G01N 23/046* (2013.01); *G01N 23/083* (2013.01)

(58) Field of Classification Search

CPC ...................................................... G01T 1/247

See application file for complete search history.

(56) References Cited

U.S. PATENT DOCUMENTS

| | | | |
|---|---|---|---|
| 6,470,065 B1 | 10/2002 | Lauther | |
| 6,990,176 B2 | 1/2006 | Sherman et al. | |
| 7,327,866 B2 | 2/2008 | Bae et al. | |
| 8,120,683 B1 | 2/2012 | Tumer et al. | |
| 9,202,961 B2 | 12/2015 | Chen et al. | |
| 10,393,891 B2 | 8/2019 | Iniewski et al. | |
| 10,396,109 B2 | 8/2019 | Iniewski et al. | |
| 10,948,613 B2 * | 3/2021 | Cao ...................... | G01T 1/2928 |
| 11,067,707 B2 | 7/2021 | Crestani et al. | |
| 2003/0058998 A1 | 3/2003 | Aufrichtig et al. | |

(Continued)

FOREIGN PATENT DOCUMENTS

| | | |
|---|---|---|
| JP | 4934826 B2 | 5/2012 |
| WO | WO2013/050229 A1 | 4/2013 |

OTHER PUBLICATIONS

Bindley, G. et al., "Direct Attach Radiation Detector Structures Including Pixelated Sensors and Read-Out Circuitry Having Varying Pitch," U.S. Appl. No. 18/612,288, filed Mar. 21, 2024.

(Continued)

*Primary Examiner* — Dani Fox
(74) *Attorney, Agent, or Firm* — THE MARBURY LAW GROUP PLLC

(57) ABSTRACT

Application specific integrated circuits (ASICs) for direct attach radiation detector structures include an array of unit cells including signal processing channel circuitry and data transmission through-substrate vias (TSVs) with reduced cross-talk between the signal processing channel circuitry and the data transmission TSVs.

11 Claims, 19 Drawing Sheets

(56) References Cited

U.S. PATENT DOCUMENTS

| | | | | |
|---|---|---|---|---|
| 2017/0322319 | A1 | 11/2017 | Iniewski et al. | |
| 2019/0339402 | A1 | 11/2019 | Crestani et al. | |
| 2021/0285897 | A1 | 9/2021 | Read et al. | |
| 2022/0045118 | A1 | 2/2022 | Kumar et al. | |
| 2022/0291401 | A1* | 9/2022 | Shirley | H10F 39/189 |
| 2023/0243985 | A1 | 8/2023 | Bindley et al. | |

OTHER PUBLICATIONS

European Patent Office Communication, Extended European Search Report for EP Application No. 22157726.5, mailed Jul. 25, 2022, 23 pages.

Goderer, E. et al., "A Four-Side-Buttable Photon Counting ASIC for Computed Tomography," 5th Workshop on Medical Applications of Spectroscopic X-Ray Detectors, Siemens Healthineers, (May 2019), 30 pages.

https://harvestimaging.com/blog/?p=1599, (Sep. 8, 2016), 17 pages.

Jerram, P. et al., "Teledyne's High Performance Infrared Detectors for Space Missions," Proceedings vol. 11180, International Conference on Space Optics—ICSO 2018; 111803D (2019) https://doi.org/10.1117/12.2536040.

Rajendran, K. et al., "Full field-of-view, high-resolution, photon-counting detector CT: technical assessment and initial patient experience," Phys Med Biol, vol. 66, No. 20, 10.1088/1361-6560/ac155e, Oct. 27, 2021; doi: 10.1088/1361-6560/ac155e.

Ayukawa, M. et al., "Radiation Detector Module with Local Processing Unit," U.S. Appl. No. 18/462,859, filed Sep. 7, 2023.

Ayukawa, M. et al., "Radiation Detector Module Including Application Specific Integrated Circuit with Through-Substrate Vias," U.S. Appl. No. 18/468,891, filed Sep. 18, 2023.

Ayukawa, M. et al., "Direct Attach Radiation Detector Structures Including a Carrier Board and Methods of Fabrication Thereof," U.S. Appl. No. 18/602,887, filed Mar. 12, 2024.

https://global.medical.canon/products/computed-tomography/pcct?utm_source=WEB-TOP, viewed on Mar. 21, 2024.

* cited by examiner

DIRECT ATTACH RADIATION DETECTOR STRUCTURES HAVING REDUCED CROSS-TALK

FIELD

The present disclosure relates generally to radiation detectors, and more specifically to direct attach radiation detector structures having reduced cross-talk.

BACKGROUND

Room temperature pixelated radiation detectors made of semiconductors, such as cadmium zinc telluride ($Cd_{1-x}Zn_xTe$ where $0<x<1$, or "CZT"), are gaining popularity for use in medical and non-medical imaging. These applications use the high energy resolution and sensitivity of the radiation detectors.

SUMMARY

According to an aspect of the present disclosure, a detector structure includes at least one radiation sensor including an array of pixel detectors, and an application specific integrated circuit (ASIC) including an array of unit cells, each unit cell including signal processing channel circuitry and a contact region on a front surface of the ASIC that is electrically coupled to a pixel detector of the array of pixel detectors, the ASIC having a first region including a first set of one or more unit cells, and a second region including a second set of one or more unit cells and least one data transmission through-substrate via (TSV), where the detector structure further includes an underfill material that is located between the front surface of the ASIC and the at least one radiation sensor in the first region of the ASIC, and the underfill material is not present in the second region of the ASIC, and/or the first set of one or more unit cells are active unit cells and the second set of one or more units cells are inactive unit cells.

According to another aspect of the present disclosure, an application specific integrated circuit (ASIC) for a detector structure includes a semiconductor substrate, a plurality of device structures located on and/or in a front side surface of the semiconductor substrate, at least one data transmission through-substrate via (TSV) extending through the semiconductor substrate, redistribution structures located over the front side surface of the semiconductor substrate and the plurality of device structures, the redistribution structures including conductive interconnect features embedded in a dielectric material matrix, and a grounded conductive feature located laterally adjacent to the at least one data transmission TSV.

According to another aspect of the present disclosure, an application specific integrated circuit (ASIC) for a detector structure includes a first unit cell including first signal processing channel circuitry, a second unit cell including second signal processing channel circuitry, a first data transmission through-substrate via (TSV) located within or adjacent to the first unit cell, a second data transmission TSV located within or adjacent to the second unit cell, transmitter circuitry configured to transmit complementary signal pairs having opposite polarity through the first data transmission TSV and the second data transmission TSV, respectively, and a mirror capacitor in the first unit cell electrically coupled to the second data transmission TSV and configured to compensate for parasitic capacitive coupling between the first data transmission TSV and the first signal processing circuitry.

Further embodiments include detector arrays including a plurality of the above-described detector structures and/or ASICs, where the radiation sensors of the plurality of detector structures form a continuous detector surface of the detector array.

Further embodiments include X-ray imaging systems including a radiation source configured to emit an X-ray beam, and a detector array including a plurality of the above-described detector structures that are configured to receive the X-ray beam from the radiation source through an intervening space configured to contain an object therein.

Further embodiments include methods of fabricating a detector structure that include mounting at least one radiation sensor over a front side surface of an application specific integrated circuit (ASIC), providing a sacrificial material between the front side surface of the ASIC and the radiation sensor in a region of the ASIC including at least one data transmission through-substrate vias, providing an underfill material in a remaining space between the front side surface of the ASIC and the radiation sensor, and selectively removing the sacrificial material from between the front side surface of the ASIC and the radiation sensor leaving the underfill material in the remaining space between the front side surface of the ASIC and the radiation sensor.

DETAILED DESCRIPTION

Figure 1A:
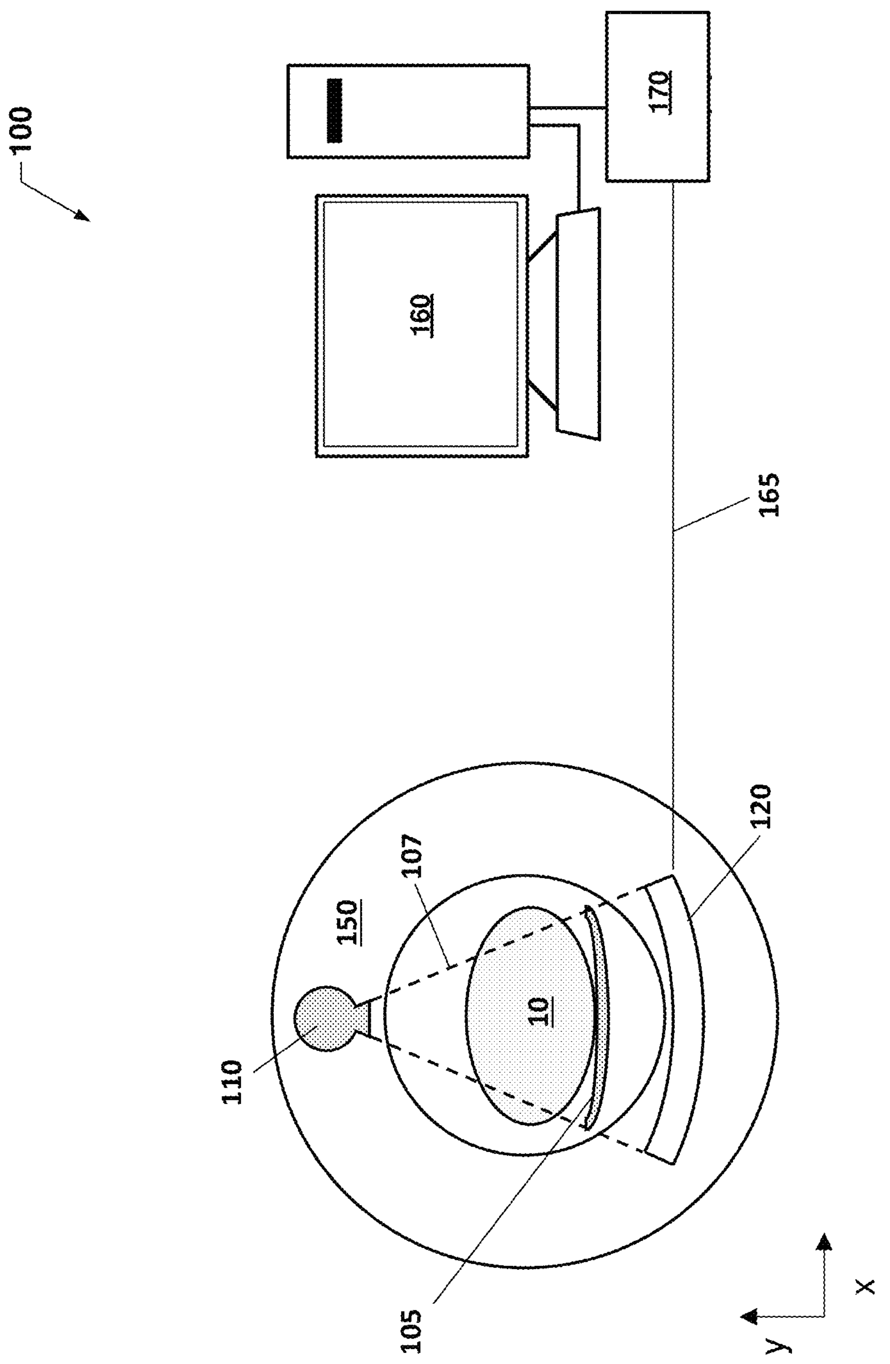
FIGS. 1A and 1B are functional block diagrams of an X-ray imaging system in accordance with various embodiments of the present disclosure.

Embodiments of the present disclosure provide detector structures, such as radiation detector units and radiation detector modules, and detector arrays formed by assembling the detector structures, and methods of manufacturing the same, the various aspects of which are described herein with reference to the drawings.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims. Any reference to claim elements in the singular, for example, using the articles "a," "an," or "the" is not to be construed as limiting the element to the singular. The terms "example," "exemplary," or any term of the like are used herein to mean serving as an example, instance, or illustration. Any implementation described herein as an "example" is not necessarily to be construed as preferred or advantageous over another implementation. The drawings are not drawn to scale. Multiple instances of an element may be duplicated where a single instance of the element is illustrated, unless absence of duplication of elements is expressly described or clearly indicated otherwise.

Ionizing radiation detectors, such as X-ray detectors, typically include a radiation-sensitive sensor material that is operatively coupled to detector read-out electronics. In most modern radiation detectors, the detector read-out electronics includes at least one semiconductor integrated circuit (IC), such as an application specific integrated circuit (ASIC) (which may also be referred to as a read out integrated circuit, or ROIC). Ionizing radiation detectors generally fall within two broad categories: energy integrating (EI) detectors and photon counting (PC) detectors. In EI detectors, the radiation-sensitive sensor material is commonly a solid-state scintillator material that is coupled to a photodiode. The scintillation light generated by the sensor material is proportional to both the energy of each photon incident on the sensor material as well as the number of incident photons per unit time. The photodiode converts the scintillation light to an electric signal that is amplified and integrated by the read-out electronics to produce the output signal.

In contrast, in a photon counting (PC) detector, the sensor material is typically a semiconductor material, such as cadmium telluride (CdTe), cadmium zinc telluride (CZT), silicon (Si), gallium arsenide (GaAS), etc., that is configured to directly detect photon interactions occurring within the sensor material. Photon interactions within the sensor material produce a cloud of charge carriers (e.g., via the photoelectric effect). A bias voltage applied to the sensor material produces an electric field that causes the charge carriers produced by the photon interactions to be swept towards electrodes located on opposite sides of the sensor material. The charge that is received at the electrodes produces a signal that may be amplified and converted into a voltage signal by the detector read-out electronics. The read-out electronics may additionally include a "comparator" that compares the amplitude of the voltage signal to a pre-set threshold value, and a "counter" that measures the total number of voltage signals that exceed the pre-set threshold value, thus providing a total count of photons that impinge on the detector. The pre-set threshold is typically set to distinguish between "true" photon interaction event signals and electronic noise signals. Thus, a PC detector may have less noise than an energy integrating (EI) detector.

A spectral photon counting (SPC) detector is a type of PC detector that utilizes multiple pre-set threshold values to sort each of the detected voltage signals into different "bins" representing different energies of the incident photons. The read-out electronics of an SPC detector may sort incident photons into one or more energy bins by comparing the amplitudes of each of the detected voltage signals to a plurality of different threshold values. The total number of energy bins may be between 2 and 12 bins, for example.

Thus, an SPC detector may provide both image information and measurements of the energy of the detected photons. An SPC detector may also be referred to as an energy-discriminating radiation detector.

Figure 1B:
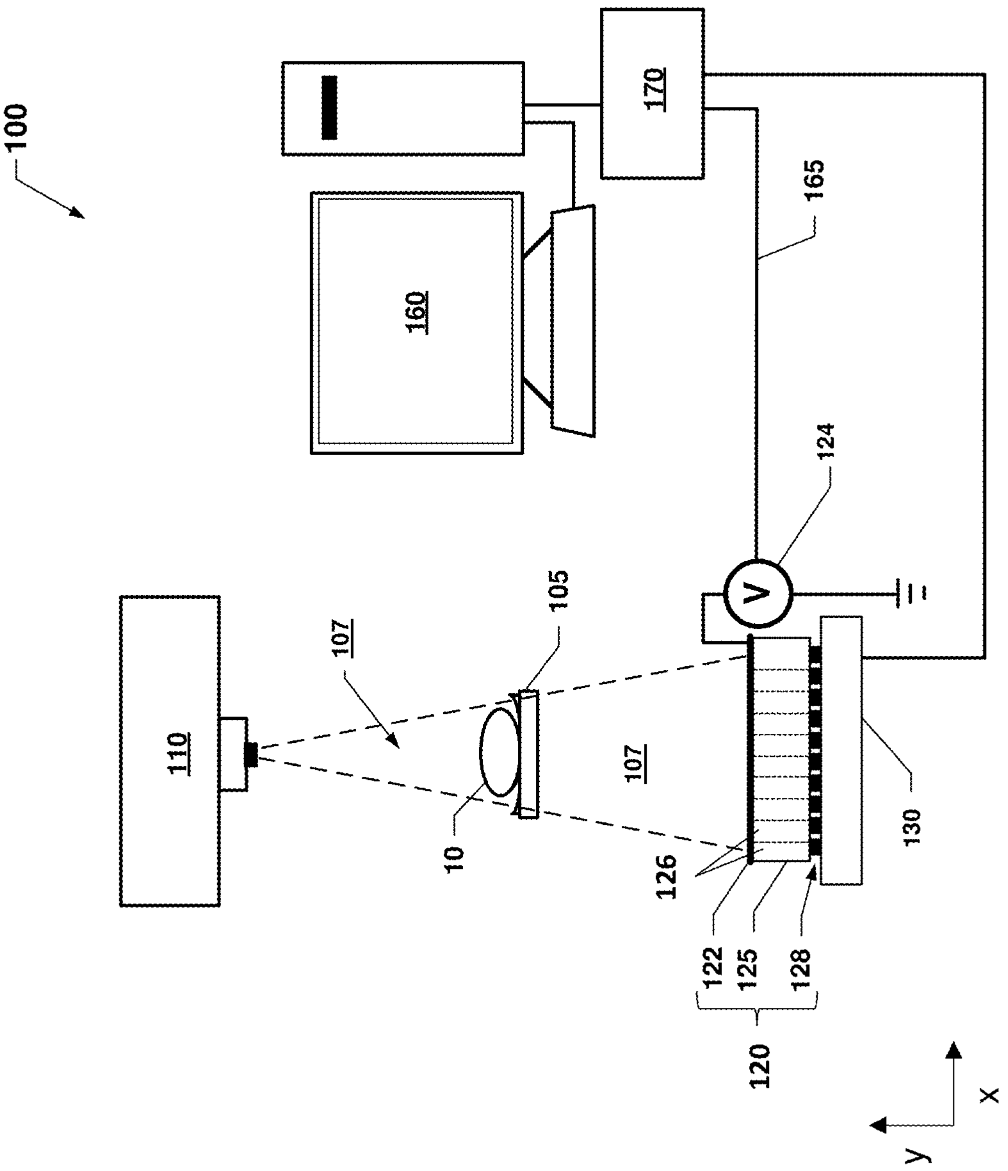

SPC detectors have been used for X-ray imaging applications, including for X-ray computed tomography (CT) imaging. FIGS. 1A and 1B are functional block diagrams of an X-ray imaging system 100 in accordance with various embodiments. The X-ray imaging system 100 may include an X-ray source 110 (i.e., a source of ionizing radiation), and an energy discriminating photon counting radiation detector 120. The X-ray imaging system 100 may additionally include a patient support structure 105, such as a table or frame, which may rest on the floor and may support an object 10 to be scanned. In some embodiments, the object 10 may be a biologic subject (i.e., a human or animal patient). The support structure 105 may be stationary (i.e., non-moving) or may be configured to move relative to other elements of the X-ray imaging system 100, such as the X-ray source 110.

As shown in FIG. 1A, the X-ray source 110 may be mounted to a gantry 150 and may move or remain stationary relative to the object 10. The X-ray source 110 is configured to deliver ionizing radiation to the radiation detector 120 by emitting an X-ray beam 107 toward the object 10 and the radiation detector 120. After the X-ray beam 107 is attenuated by the object 10, the beam of radiation 107 is received by the radiation detector 120.

The radiation detector 120 may be segmented or configured into a large number of small "pixel" detectors, as described in further detail below. The radiation detector 120 may a spectral photon counting (SPC) detector that includes a radiation-sensitive sensor material, such as semiconductor material, coupled to detector read-out electronics (e.g., one or more above-described ASICs).

A control unit 170 may be configured to control the operations of the X-ray source 110 and the radiation detector 120. The control unit 170 may be coupled to and operated from a computing device 160. Alternatively, the computing device 160 and the control unit 170 may be integrated together as one device.

In the exemplary embodiment shown in FIGS. 1A and 1B, the X-ray imaging system 100 is an X-ray computed tomography (CT) imaging system 100. The CT imaging system 100 may include a gantry 150, which may include a moving part, such as a circular, rotating frame with the X-ray source 110 mounted on one side and the radiation detector 120 mounted on the other side. The radiation detector 120 may have a curved shape along its long axis (i.e., the x-axis direction in FIG. 1A) such that each of the pixel detectors along the length of the radiation detector may face towards the focal spot of the X-ray source 110. The gantry 150 may also include a stationary (i.e., non-moving) part (not shown in FIG. 1A), such as a support, legs, mounting frame, etc., which rests on the floor and supports the moving part. The X-ray source 110 may emit a fan-shaped or cone-shaped X-ray beam 107 as the X-ray source 110 and the radiation detector 120 rotate on the moving part of the gantry around the object 10 to be scanned. After the X-ray beam 107 is attenuated by the object 10, the X-ray beam 107 is received by the radiation detector 120. The curved shape of the radiation detector 120 may allow the CT imaging system 100 to create a 360° continuous circular ring of the image of the object 10 by rotating the moving part of the gantry around the object 10.

For each complete rotation of the X-ray source 110 and the radiation detector 120 around the object 10, one cross-sectional slice of the object 10 may be acquired. As the X-ray source 110 and the radiation detector 120 continue to rotate, the radiation detector 120 may take numerous snapshots called "views". Typically, about 1,000 profiles are taken in one rotation of the X-ray source 110 and the radiation detector 120. The X-ray source 110 and the detector 120 may slowly move relative to the patient along a horizontal direction (i.e., into and out of the page in FIG. 1A) so that the detector 120 may capture incremental cross-sectional profiles over a region of interest (ROI) of the object 10, which may include the entire object 10. The data acquired by the radiation detector 120 may be passed along to the computing device 160 that may be located remotely from the radiation detector 120 via a connection 165. The connection 165 may be any type of wired or wireless connection. If the connection 165 is a wired connection, the connection 165 may include a slip ring electrical connection between any structure (e.g., gantry) supporting the radiation detector 120 and a stationary support part of the support structure, which supports any part (e.g., a rotating ring). If the connection 165 is a wireless connection, the radiation detector 120 may contain any suitable wireless transceiver to communicate data with another wireless transceiver that is in communication with the computing device 160. The computing device 160 may include processing and imaging applications that analyze each profile obtained by the radiation detector 120, and a full set of profiles may be compiled to form a three-dimensional computed tomographic (CT) reconstruction of the object 10 and/or two-dimensional images of cross-sectional slices of the object 10.

Various alternatives to the design of the X-ray imaging system 100 of FIGS. 1A and 1B may be employed to practice embodiments of the present disclosure. X-ray imaging systems may be designed in various architectures and configurations. For example, an X-ray imaging system may have a helical architecture. In a helical X-ray imaging scanner, the X-ray source 110 and radiation detector 120 are attached to a freely rotating gantry 150. During a scan, a table moves the object 10 smoothly through the scanner, or alternatively, the X-ray source 110 and detector 120 may move along the length of the object 10, creating helical path traced out by the X-ray beam. Slip rings may be used to transfer power and/or data on and off the rotating gantry 150. In other embodiments, the X-ray imaging system may be a tomosynthesis X-ray imaging system. In a tomosynthesis X-ray scanner, the gantry may move in a limited rotation angle (e.g., between 15 degrees and 60 degrees) in order to detect a cross-sectional slice of the object 10. The tomosynthesis X-ray scanner may be able to acquire slices at different depths and with different thicknesses that may be reconstructed via image processing.

Figure 2A:
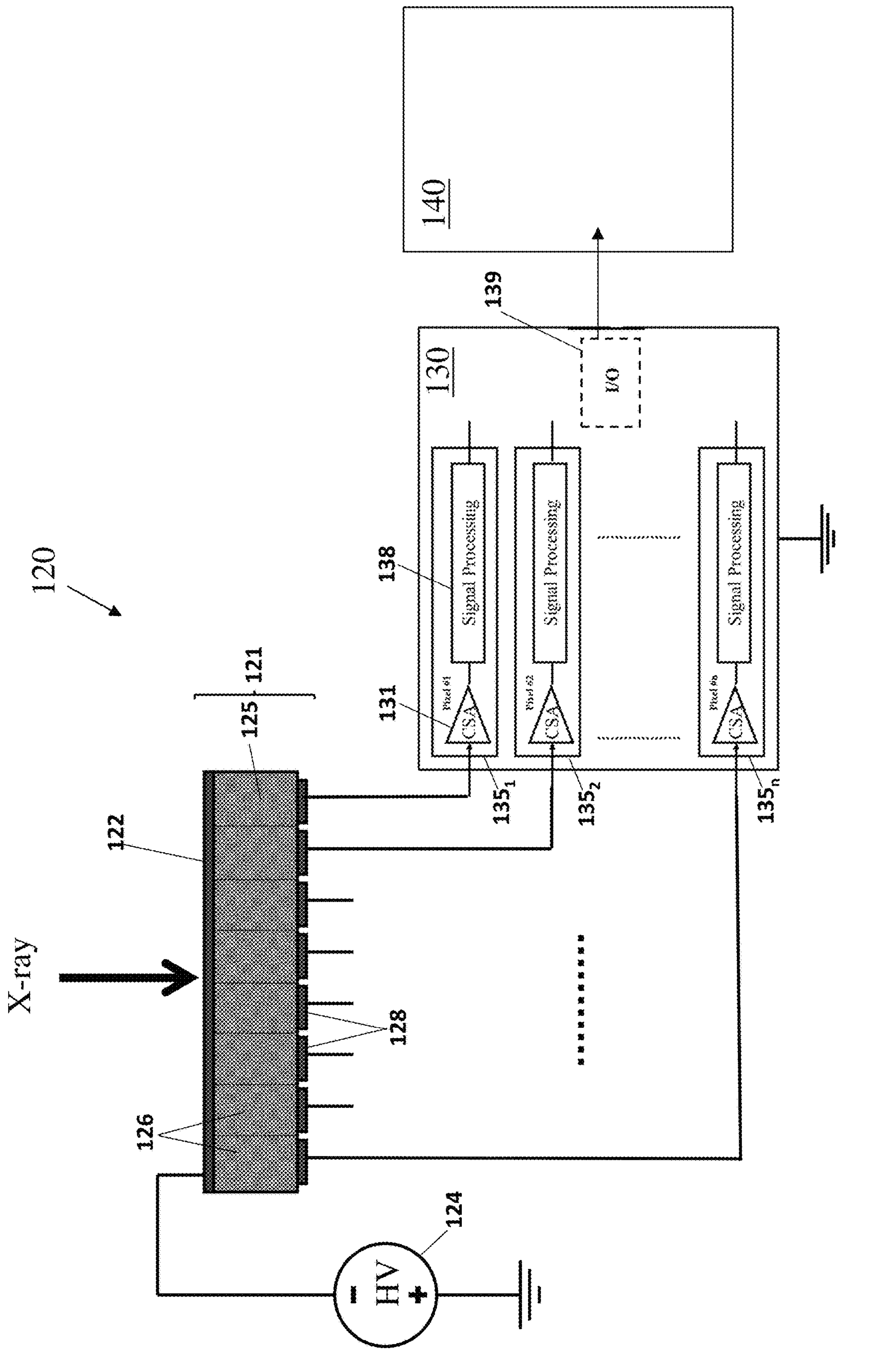
FIG. 2A schematically illustrates a radiation detector including a pixelated radiation sensor coupled to a detector application specific integrated circuit (ASIC) according to various embodiments of the present disclosure.

FIG. 2A schematically illustrates a radiation detector 120 including a pixelated radiation sensor 121 coupled to a detector application specific integrated circuit (ASIC) 130 according to various embodiments of the present disclosure. The radiation sensor 121 may be controlled by a high voltage bias power supply 124 that may selectively create an electric field between an anode 128 and cathode 122 pair coupled thereto. In one embodiment, the radiation sensor 121 includes a plurality of anodes 128 and one common cathode 122 electrically connected to the power supply 124. Each of the anodes 128 may define a different pixel detector 126 of a pixelated radiation detector 120. The radiation sensor 121 may include a detector material 125, such as a semiconductor material disposed between the anode(s) 128 and cathode 122 and thus configured to be exposed to the electrical field therebetween. In various embodiments, the radiation sensor 121 may be arranged such that the surface of the detector material 125 over which the cathode 122 is located faces towards the X-ray source 110 (see FIG. 1B). Thus, X-ray photons from the X-ray source 110 may impinge on the cathode-side of the radiation sensor 121. The semiconductor material 125 may include any suitable semiconductor material for detecting X-ray radiation disposed between the anode(s) 128 and cathode 122 and thus configured to be exposed to the electrical field therebetween. In various embodiments, the semiconductor material of the radiation sensor 121 may include a II-VI semiconductor material, such as cadmium telluride, cadmium zinc telluride (i.e., CdZnTe or "CZT"), cadmium selenide telluride, and cadmium zinc selenide telluride. Other suitable semiconductor materials are within the contemplated scope of disclosure.

An above-described detector application specific integrated circuit (ASIC) 130 may be coupled to the anode(s) 128 of the radiation sensor 121. The detector ASIC 130 may receive signals (e.g., charge or current) from the anode 128 (s) and be configured to provide data to and be controlled by a control unit 170 (see FIG. 1B). The signals received by the detector ASIC 130 may be in response to photon interaction events occurring within the radiation-sensitive semiconductor material of the detector material 125. Accordingly, the signals received by the detector ASIC 130 may be referred to as "event detection signals."

The detector ASIC 130 may include a semiconductor integrated circuit (IC) die that includes a substrate (e.g., a silicon substrate) including a semiconductor material layer over a surface of the substrate and a plurality of circuit elements (e.g., transistors, resistors, capacitors, inductors, diodes, etc.) formed on and/or in the semiconductor material layer. The circuit elements of the detector ASIC 130 may be configured to perform signal processing operations on event detection signals received from the anode(s) 128 of the radiation sensor 121. In particular, each anode 128 of the radiation sensor 121 may be electrically coupled to an input node of a respective signal processing chain or "channel" $\mathbf{135}_1$, $\mathbf{135}_2$, . . . $\mathbf{135}_n$, of the detector ASIC 130. Thus, in various embodiments, event detection signals from each anode 128 of the radiation sensor 121 may be processed by a separate channel $\mathbf{135}_1$, $\mathbf{135}_2$, . . . $\mathbf{135}_n$ of the ASIC 130. Accordingly, the total number of signal processing channels $\mathbf{135}_1$, $\mathbf{135}_2$, . . . $\mathbf{135}_n$ of the ASIC 130 may be at least as great as the total number of pixel detectors 126 of the radiation sensor(s) 121 that are coupled to the ASIC 130. Each of the channels $\mathbf{135}_1$, $\mathbf{135}_2$, . . . $\mathbf{135}_n$ of the ASIC 130 may include a respective amplifier 131 and signal processing circuitry 138.

Figure 2B:
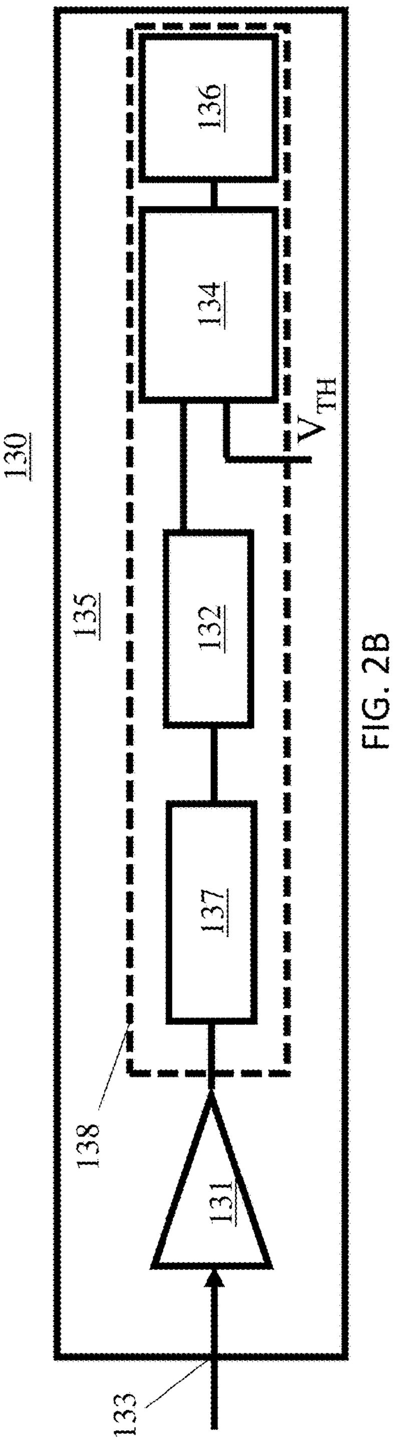
FIG. 2B is a schematic block diagram illustrating a signal processing channel of a detector ASIC for a photon counting (PC) radiation detector according to an embodiment of the FIG. 2C is a schematic block diagram illustrating a signal processing channel of a detector ASIC for a spectral photon counting (SPC) radiation detector according to an embodiment of the present disclosure.

FIG. 2B is a schematic block diagram illustrating a signal processing channel 135 of a detector ASIC 130 for a photon counting (PC) radiation detector according to an embodiment of the present disclosure. Detection signals (e.g., analog charge signals) from an anode 128 of a radiation sensor 121 may be received at a channel input node 133, which may be, for example, a bond pad located on a surface of the ASIC 130. The detection signals may be fed to an amplifier 131 that may be configured to convert the charge signal to a voltage signal. In some embodiments, the amplifier 131 may be a charge sensitive amplifier (CSA). Alternatively, other types of amplifiers, such as a trans-impedance amplifier (TIA), may be utilized. The signal processing channel 135 may optionally include a base line restoration (BLR) circuit block 137 that may be used to preserve the reference (or baseline) level for the signal (i.e., the common mode voltage on top of which the differential-sensor-generated signal resides).

The signal processing channel 135 may additionally include a shaper circuit block 132 that may be configured to "shape" the signal that is output by the amplifier 131. For example, the shaper circuit block 132 may "shape" (i.e., modify one or more characteristics of) the voltage signal from the amplifier 131 within the time-domain or frequency-domain to enable the amplitude of the signal to be read with high accuracy. Alternatively, or in addition, the shaper circuit block 132 may include a filter (e.g., a band-pass filter) that may modify the spectral characteristics of the signal within the frequency-domain.

The signal processing channel 135 may additionally include a discrimination circuit block. In the embodiment shown in FIG. 2B, the discrimination circuit block includes a comparator circuit 134. The comparator circuit 134 compares the signal output from the shaper circuit block 132 with a reference signal. The reference signal may be maintained at a threshold voltage, $V_{TH}$, that represents a cut-off reference photon energy. For example, to detect photons having an energy over 20 keV, the reference signal may be set at a threshold voltage, $V_{TH}$, that is the equivalent of the signal produced by a 20 keV photon interaction event. The threshold voltage, $V_{TH}$, for a given cut-off reference photon energy may be determined using a calibration process. When the amplitude of a signal from the shaper circuit block 132 is determined to be greater than the threshold voltage, $V_{TH}$, a counter circuit block 136 may increment a count of detected photon interaction events.

Figure 2C:
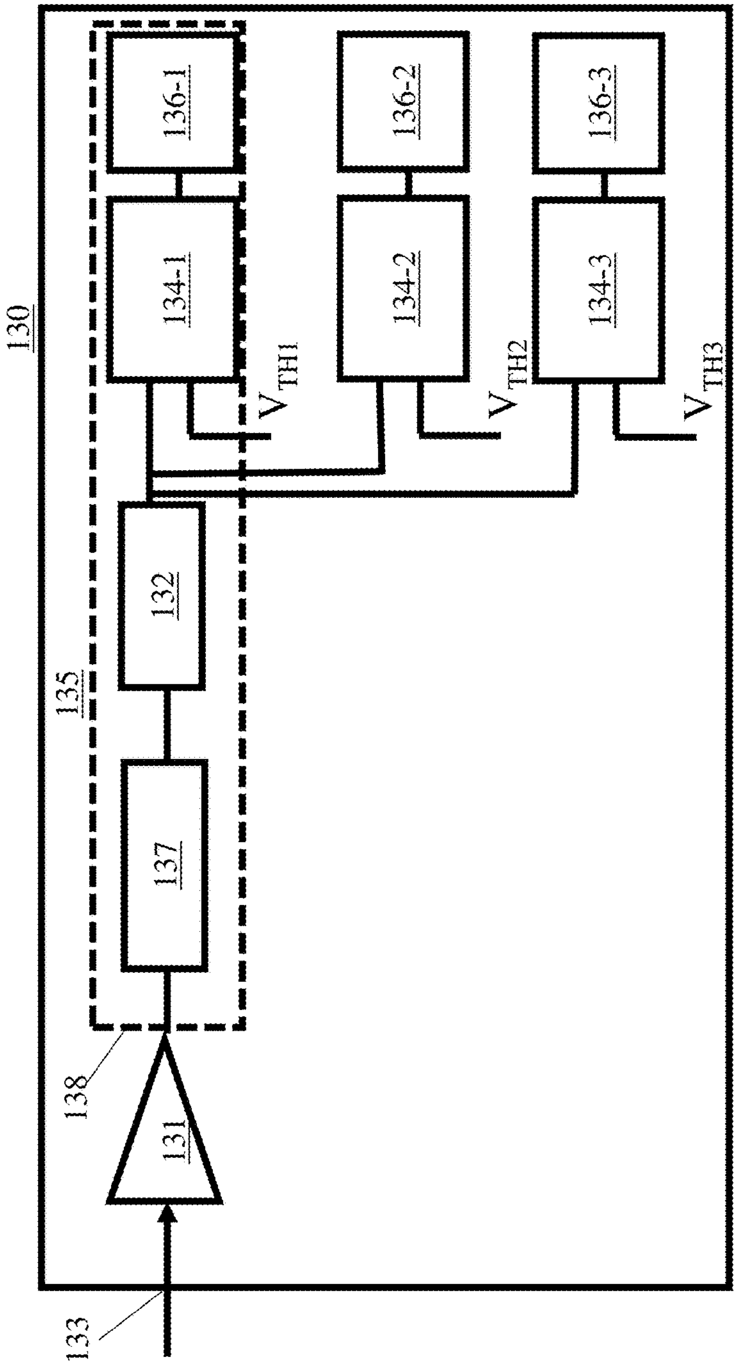

FIG. 2C is a schematic block diagram illustrating a signal processing channel 135 of a detector ASIC 130 for a spectral photon counting (SPC) radiation detector according to an embodiment of the present disclosure. The signal processing channel 135 of FIG. 2C may include an amplifier 131, an optional BLR circuit block 137, and a shaper circuit block 132 as described above with reference to FIG. 2A. The signal processing channel 135 for an SPC radiation detector may differ from the signal processing channel 135 in FIG. 2A in that the output signal from the shaper circuit block 132 may be provided to a plurality of different comparator circuits 134-1, 134-2, 134-3, etc. Each comparator circuit 134-1, 134-2, 134-3 may compare the amplitude of the signal from the shaper circuit block 132 to a different threshold voltage, $V_{TH1}$, $V_{TH2}$, and $V_{TH3}$, that represents a different cut-off reference photon energy. A plurality of counter circuit blocks 136-1, 136-2 and 136-3 associated with the respective comparator circuits 134-1, 134-2 and 134-3 may increment a count of detected photon interaction events when the detected signal amplitude is greater than the respective threshold voltage, $V_{TH1}$, $V_{TH2}$, and $V_{TH3}$. The threshold voltages $V_{TH1}$, $V_{TH2}$, and $V_{TH3}$ may be set to define different ranges or "bins" of photon energies. Thus, in an example where $V_{TH1}$ corresponds to a cut-off reference photon energy of 20 keV, $V_{TH2}$ corresponds to a cut-off reference photon energy of 50 keV, and $V_{TH3}$ corresponds to a cut-off reference photon energy of 80 keV, photons having energies between 20-50 keV may be classified in a first energy bin, photons having energies between 50-80 keV may be classified in a second energy bin, and photons having energies>80 keV may be classified in a third energy bin. Although FIG. 2C illustrates a signal processing channel 135 that includes three sets of comparator circuits 134-1, 134-2 and 134-3 and counter circuit blocks 136-1, 136-2 and 136-3, it will be understood that the signal processing channels 135 of an ASIC 130 for an SPC radiation detector may have a greater or lesser number of sets of comparator circuits 134-1, 134-2 and 134-3 and counter circuit blocks 136-1, 136-2 and 136-3, such as between 2 and 8 sets of comparator circuits 134-1, 134-2 and 134-3 and counter circuit blocks 136-1, 136-2 and 136-3.

An ASIC 130 for an SPC radiation detector 120 may include a plurality (e.g., hundreds) of identical or substantially-identical signal processing channels 135 as shown in FIG. 2C. Each channel 135 may be electrically coupled to an anode electrode 128 of a particular pixel detector 126 and may output photon count data of photon interaction events occurring within the particular pixel detector 126 over multiple energy bins. Referring again to FIG. 2A, the ASIC 130 may further include input/output (I/O) circuitry 139 that may be configured to transmit the photon count data from the ASIC 130 to another electronic component of the imaging system 100. In some embodiments, the I/O circuitry 139 may include high-speed I/O circuitry, such as low voltage differential signaling (LVDS) transmission circuitry.

Referring once again to FIG. 2A, in addition to the above-described ASIC 130, the read-out circuitry for the radiation detector 120 may include at least one additional processor 140, such as a field programmable gate array (FPGA). Other suitable processors are within the contemplated scope of disclosure. The at least one additional processor 140 may function as a downstream aggregator of photon count data output from the ASIC 130 and may optionally perform additional signal processing on the photon count data. In some embodiments, the at least one additional processor 140 may be used for configuration of the ASIC 130.

The ASIC 130 is typically manufactured using semiconductor fabrication processes, and thus the layout and connectivity patterns of the circuit elements are normally fixed during the semiconductor device design and fabrication processes and generally cannot be altered in the field. By contrast, the additional processor(s) 140 may include an FPGA or other processing device that may be programmed in the field using fuses or similar technology.

In some embodiments, radiation detector 120 may have a modular configuration including a plurality of detector modules mounted on a common support structure, such as a detector array frame, to form a detector array (also known as a detector module system (DMS)) that includes a plurality of pixel detectors 126 extending over a continuous one-dimensional (1D) or two-dimensional (2D) detector array surface. Each detector module may include at least one above-described radiation sensor 121, at least one ASIC 130 electrically coupled to the at least one radiation sensor, and a module circuit board. The module circuit board may support transmission of electrical power, control signals, and data signals between the module circuit board and the at least one ASIC 130 and the at least one radiation sensor 121 of the detector module, and may further support transmission of electrical power, control signals, and data signals between the module circuit board and the control unit 170 of the X-ray imaging system 100, other module circuit boards of the detector array, and/or a power supply for the detector array.

Figure 3A:
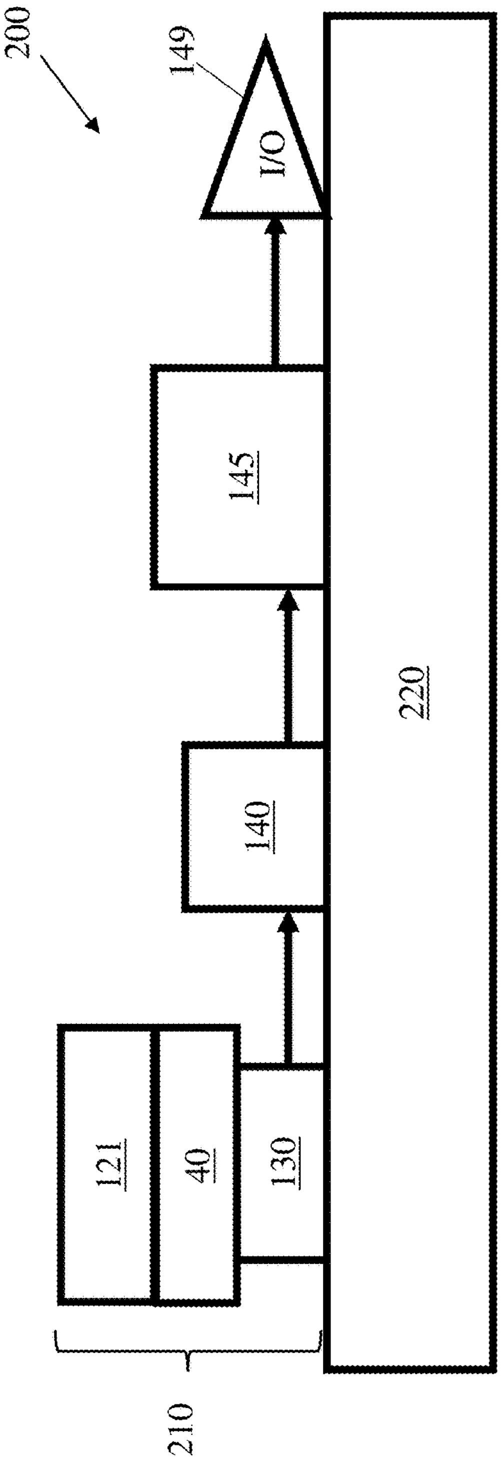
FIG. 3A schematically illustrates an "indirect attach" radiation detector unit that includes an interposer located between a radiation sensor and an ASIC.
Figure 3B:
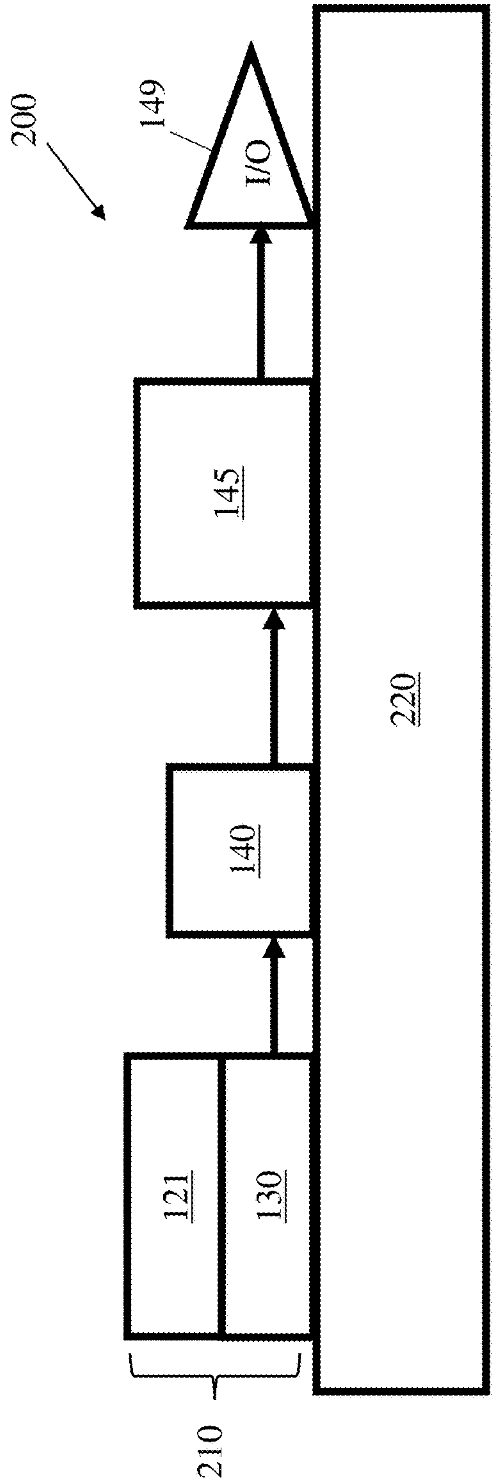
FIG. 3B schematically illustrates a "direct attach" radiation detector unit that includes a radiation sensor directly mounted to an ASIC without an interposer or similar intervening structural component in accordance with various embodiments of the present disclosure.

FIGS. 3A and 3B are functional block diagrams that schematically illustrate examples of detector modules 200 according to various aspects of the present disclosure. In the examples shown in FIGS. 3A and 3B, the detector modules 200 include a single radiation sensor 121 and ASIC 130 electrically coupled to a module circuit board 220. However, it will be understood that a detector module 200 may include more than one radiation sensor 121 and/or ASIC 130. In some embodiments, a detector module 200 may be constructed from a set of radiation detector units 210, which may also be referred to as "mini-modules" or "submodules." In some embodiments, each of the radiation detector units 210 may include one or more radiation sensors 121 coupled to a single ASIC 130. In the embodiment detector modules 200 shown in FIGS. 3A and 3B, an above-described additional processor 140 (e.g., an FPGA) is electronically coupled to the ASIC 130, and a local memory storage 145 may be electronically coupled to the additional processor 140. The local memory storage 145 may be SRAM, DRAM, or any other type of volatile or non-volatile memory. In some embodiments, the local memory storage 145 may be used to temporarily store image data (e.g., photon count data) before the data is output to an external component, such as a downstream aggregation point on the detector array and/or an external computing device (e.g., computing device 160 in FIG. 1B). The detector modules 200 may additionally include input/output (I/O) circuitry 149. In some embodiments, the additional processor 140, the local memory storage 145 and the I/O circuitry 149 may be located on the module circuit board 220.

FIGS. 3A and 3B schematically illustrate two different configurations for mounting a radiation sensor 121 to an ASIC 130 to provide a radiation detector unit 210. FIG. 3A illustrates an "indirect attach" radiation detector unit 210 that includes an interposer 40 located between radiation sensor 121 and the ASIC 130. The interposer 40 may include an insulating matrix having conductive (e.g., metal) interconnect structures (not shown in FIG. 3A) embedded therein. Bonding pads (not shown in FIG. 3A) may be located on the front side and the back side of the interposer 40 and may be electrically coupled to the conductive interconnect structures. As used herein, the "front side" of elements refers to the side that faces the incoming radiation, and the "backside" of elements refers to the side that is the opposite side of the front side. The radiation sensor 121 may be mounted to the front side of the interposer 40 via an array of bonding structures (e.g., copper pillars, solder balls, etc.) located between bonding pads on the back side of the radiation sensor 121 and the bonding pads on the front side of the interposer 40. The ASIC 130 may be mounted to the back side of the interposer 40 via an array of bonding structures (e.g., copper pillars, solder balls, etc.) located between bonding pads on the front side of the ASIC 130 and the bonding pads on the back side of the interposer 40. The conductive interconnect structures of the interposer 40 may route detection signals from the anodes 128 of each pixel detector 126 of the radiation sensor 121 through the interposer 40 to a corresponding signal processing channel 135 of the ASIC 130. Exemplary embodiments of "indirect attach" radiation detector units 210 and detector modules 200 including an interposer 40 are described, for example, in U.S. Pat. No. 11,067,707 to Crestani et al., the entire teachings of which are incorporated by reference herein for all purposes.

FIG. 3B illustrates a "direct attach" radiation detector unit 201 that includes a radiation sensor 121 directly mounted to an ASIC 130 without an interposer or similar intervening structural component such that each pixel detector 126 is located over and is directly electrically connected to a corresponding signal processing channel of the ASIC 130. In particular, a plurality of bonding structures (e.g., copper pillars, solder balls, conductive epoxy material, etc.) may extend between an array of bonding pads located on the back side of the radiation sensor 121 and an array of bonding pads located on the front side of the ASIC 130 to directly connect each of the pixel detectors 126 to an input of a signal processing channel 135 of the ASIC 130. Exemplary embodiments of "direct attach" radiation detector units 210 and detector modules 200 are described, for example, in U.S. Provisional Patent Application No. 63/380,769, filed on Oct. 25, 2022, and U.S. patent application Ser. No. 18/158,695, filed on Jan. 24, 2023, the entire teachings of both of which are incorporated by reference herein for all purposes. A "direct attach" detector configuration as shown in FIG. 3B may result in reduced input node capacitance compared to an equivalent indirect attach detector having an interposer 40 (e.g., 0.2 pF vs. 1.0 pF). This may result in lower power consumption (e.g., 0.2 mW/channel compared to 0.8 mW/channel using an interposer) and lower equivalent noise charge (ENC) (e.g., 250 e− vs, 700 e− using an interposer).

Figure 4:
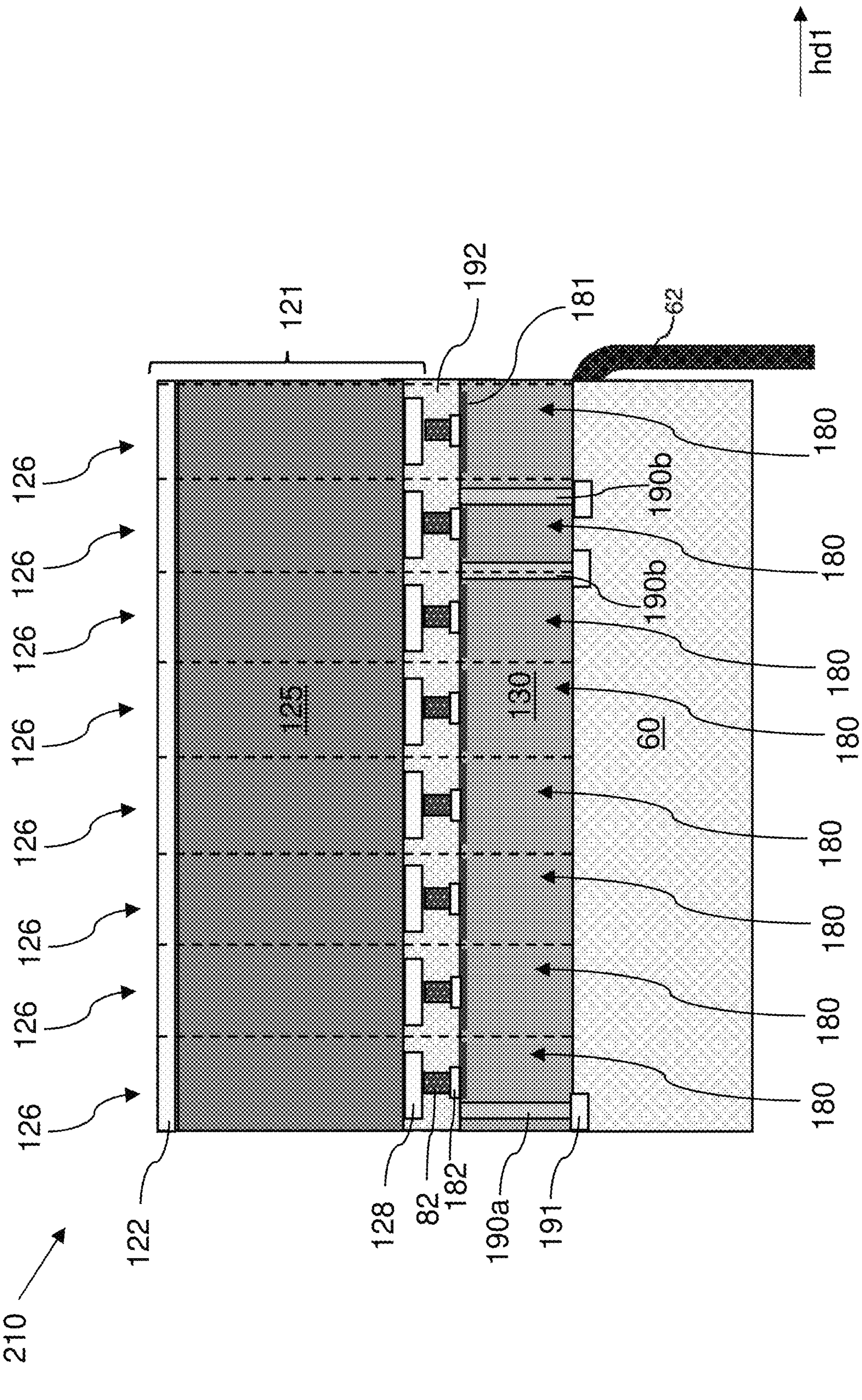
FIG. 4 is a vertical cross-sectional view of a comparative "direct attach" radiation detector unit.

FIG. 4 is a vertical cross-sectional view of an exemplary "direct attach" radiation detector unit 210. Referring to FIG. 4, the radiation detector unit 210 includes a radiation sensor 121 coupled to an ASIC 130. The radiation sensor 121 may include an above-described detector material 125 having at least one cathode electrode 122 on a front side of the radiation sensor 121 and a plurality of anode electrodes 128 on a back side of the radiation sensor 121 defining an array of pixel detectors 126 as described above. The radiation sensor 121 may be directly mounted to the front side of the ASIC 130 via a plurality of bonding material portions 82. In other words, the radiation sensor 121 may be mechanically and electrically coupled to the ASIC 130 via the plurality of bonding material portions 82, and no interposer or similar intervening structural component for routing of electrical signals between the radiation sensor 121 and the ASIC 130 is located between the back side of the radiation sensor 121 and the front side of the ASIC 130. As discussed above, directly mounting the radiation sensor(s) 121 to the front side of the ASIC 130 may provide a significant reduction in input node capacitance as compared to a radiation detector unit that includes an interposer 40 located between the radiation sensor(s) 121 and the ASIC 130.

The plurality of bonding material portions 82 may be arranged in an array, such as a rectangular array, having the same periodicity as the periodicity of the anode electrodes 128 on the back side of the radiation sensor 121. Thus, each bonding material portion 82 may electrically couple a respective anode electrode 128 of the radiation sensor 121 to the front side of the ASIC 130. In one non-limiting embodiment, the bonding material portions 82 may be composed of a conductive epoxy. Other suitable bonding materials, such as a low temperature solder material with under bump metallization, may be utilized to mount the radiation sensor 121 to the front side of the ASIC 130. An optional underfill material 192 may be provided in the space between the back side surface of the radiation sensor 121 and the front side surface of the ASIC 130 and laterally surrounding the bonding material portions 82. The underfill material 192 may include a suitable insulating material, such as an insulating epoxy material.

In various embodiments, the ASIC 130 may include an arrangement of circuit components located on and/or within a single supporting substrate, which may be a semiconductor material substrate (e.g., a silicon substrate). In various embodiments, the ASIC 130 may include an array of active circuit regions 181 that may each include an above-described signal processing channel 135 for a pixel detector 126 of the radiation sensor 121. In various embodiments, the horizontal dimensions of the ASIC 130 may generally correspond to the dimensions of the radiation sensor(s) 121 mounted over the front side of the ASIC 130. In particular, the dimensions of the ASIC 130 along respective orthogonal horizontal directions (i.e., within a horizontal plane containing a first horizontal direction hd1) may be substantially equal (e.g., within ±4%, such as ±0-2%) to the dimensions of the radiation sensor(s) 121 mounted to the ASIC 130 along the same horizontal directions. In the embodiment illustrated in FIGS. 3A and 3B, a single radiation sensor 121 is mounted to the front side of the ASIC 130, although it will be understood that in other embodiments, multiple radiation sensors 121 may be mounted to the front side of the ASIC 130, such that the horizontal dimensions of the ASIC 130 may be substantially equal to the combined dimensions of the multiple radiation sensors 121 along the corresponding horizontal directions. In some embodiments, the ASIC 130 and each of the radiation sensors 121 mounted thereto may have a rectangular periphery. This may enable any of the four peripheral sides of the radiation detector unit 210 to be abutted against a peripheral side of an adjacent radiation detector unit 210 upon assembly of multiple radiation detector units 210 in a two-dimensional detector array.

Referring again to FIG. 4, the radiation sensor 121 may include array of contiguous pixel detectors 126 and the ASIC 130 may include a plurality of contiguous pixel regions 180 underlying each of the pixel detectors 126 of the radiation sensor 80, as indicated by the dashed lines in FIG. 4. A bonding material portion 82 may extend between each pixel detector 126 of the radiation sensor 121 and a corresponding pixel region 180 of the ASIC 130. Thus, as shown in FIG. 4, each pixel region 180 of the ASIC 130 includes a contact region 182 (e.g., a bond pad) in which a bonding material portion 82 contacts the front side of the ASIC 130. Each contact region 182 may be electrically coupled to an active circuit region 181 of the ASIC 130 and may function as an input node to a signal processing channel 135. In some embodiments, each pixel region 180 of the ASIC 130 (which may also be referred to as a "unit cell" of the ASIC) may include a contact region 182 and an active circuit region 181 that includes signal processing channel 135 circuitry for the pixel detector 126 of the radiation sensor 121 that overlies the pixel region 180. Each of the pixel regions 180 of the ASIC 130 may have horizontal dimensions that are substantially equal (e.g., within ±4%, such as ±0-2%) to the corresponding dimensions of the pixel detector 126 overlying the pixel region 180 of the ASIC 130. In some embodiments, the horizontal dimensions of each pixel region 180 may be in a range of 250-500 μm, although greater and lesser dimensions are within the contemplated scope of disclosure. In one non-limiting embodiment, each of the pixel regions 180 of the ASIC 130 may be a 330 μm×330 μm square. In other embodiments, the pixel regions 180 may be rectangular-shaped in which the different horizontal dimensions are not equal. In various embodiments, the plurality of pixel regions 180 may extend continuously over the entire area of the ASIC 130.

Referring again to FIG. 4, the radiation detector unit 210 may further include a carrier board 60 that is configured to route power supply to the ASIC 130 and to the at least one radiation sensor 121, control signals to the ASIC 130, and data signals (e.g., digital detection signals) generated by the ASIC 130. One or more cables 62, such as a flex cable assembly, may be attached to a respective side of the carrier board 60, and another end of each cable may be connected to the above-described module circuit board 220. The carrier board 60 may be a printed circuit board including an insulating substrate and printed interconnection circuits. In various embodiments, the ASIC 130 may be disposed over the carrier board 60 such that the back side of the ASIC 130 may contact the front side of the carrier board 60.

Referring again to FIG. 4, a plurality of through-substrate vias (TSVs) 190*a*, 190*b* may be provided in the ASIC 130. Each of the TSVs 190*a*, 190*b* may be located within a pixel region 180 of the ASIC 130. The TSVs 190*a*, 190*b* may include an electrically conductive material (e.g., a metal material, such as copper) that extends between the front side and the back side of the ASIC 130. In embodiments in which the ASIC 130 may be formed on and/or in a silicon substrate, the TSVs 190*a*, 190*b* may also be referred to as "through-silicon vias."

Accordingly, electrical connections between the carrier board 60 and the ASIC 130 may be made through the back side of the ASIC 130 via the plurality of TSVs 190*a*, 190*b*. In particular, each of the TSVs 190*a*, 190*b* may electrically contact a conductive trace 191 located on the front side of the carrier board 60, as schematically illustrated in FIG. 4. This may obviate the need for wire bond and/or interposer connections between the front side of the carrier board 60 and the front side of the ASIC 130, which may help to minimize the footprint of the radiation detector unit 210. In various embodiments, outer periphery of the carrier board 60 may not extend beyond the outer periphery of the ASIC(s) 130 and radiation sensor(s) 121 located over the carrier board 60 so as to provide a radiation detector unit 210 that is buttable on all four sides.

In other embodiments, a portion of the ASIC 130 may extend beyond the outer periphery of the radiation sensor(s) 121 and a portion of the carrier board 60 may extend beyond the outer periphery of the ASIC 130. A plurality of wire bond connections may extend between the front side of the carrier board 60 and the front side of the ASIC 130, as is described and illustrated in the above-referenced U.S. patent application Ser. No. 18/158,695. The wire bond connections between the carrier board 60 and the ASIC 130 may be in addition to, or may be in lieu of, electrical connections between the front side of the carrier board 60 and the back side of the ASIC 130 via TSVs 190*a*, 190*b* as described above.

The TSVs 190*a*, 190*b* may be fabricated by forming plurality of deep openings in the ASIC substrate using photolithographic patterning and an anisotropic etching process, performing thin film deposition of insulating, barrier and/or metallic seed layers within each of the openings, and filling the openings with a metallic fill material via a suitable deposition process, such as an electrodeposition process. A thinning process, such as a grinding or chemical-mechanical planarization (CMP) process, may be used to remove material from the backside of the substrate to expose the TSVs 190*a*, 190*n*. In some embodiments, the substrate may be thinned to a thickness of less than 200 μm, such as 10 to 150 μm, for example, 50 to 100 μm. The TSVs 190*a*, 190*b* may be formed using a "TSV first" process in which the plurality of TSVs 190*a*, 190*b* may be formed through a semiconductor material substrate (e.g., a silicon wafer) prior to fabricating the electronic circuit components (e.g., transistors, capacitors, resistors, etc.) of the ASIC 130 via front end of the line (FEOL) semiconductor fabrication processes. In other embodiments, the TSVs 190*a*, 190*b* may be formed after FEOL processes are complete but prior to the formation of metal interconnect structures via back end of the line (BEOL) fabrication processes. In still further embodiments, the TSVs 190*a*, 190*b* may be formed using a "TSV last" process either during or following the completion of BEOL processes. "TSV last" fabrication may provide the highest degree of flexibility, as the ASIC 130 may be initially fabricated at a silicon foundry and then subsequently processed to form the TSVs 190*a*, 190*b*.

Each of the TSVs 190*a*, 190*b* may have horizontal dimensions (e.g., a diameter) between about 1 μm and about 200 μm, although greater and lesser dimensions for the TSVs 190*a*, 190*b* may also be utilized. In one non-limiting embodiment, the dimensions of the TSVs 190*a*, 190*b* along horizontal directions may be about 50 μm. As noted above, each of the TSVs 190*a*, 190*b* is located in a pixel region 180 of the ASIC 130 that underlies a pixel detector 126 of the radiation sensor 121. Thus, each of the TSVs 190*a*, 190*b* shares the pixel region 180 in which it is located with a contact region 181 that electrically couples the pixel region 180 to the overlying pixel detector 126 of a radiation sensor 121 via a bonding material portion 82. The TSVs 190*a*, 190*b* may be laterally spaced from the contact regions 182 to avoid electrically-shorting the bonding material portions 82 to the TSV 190*a*, 190*b*. Metal interconnect structures (not shown in FIG. 4) on the front side of the ASIC 130 may electrically couple the TSVs 190*a*, 190*b* to the various circuit components (e.g., transistors, resistors, capacitors, etc.) of the ASIC 130. In the embodiment shown in FIG. 4, only a portion of the pixel regions 180 of the ASIC 130 include a TSV 190*a*, 190*b*, although it will be understood that in other embodiments, all of the pixel regions 180 may include at least one TSV 190*a*, 190*b*. The total number of TSVs 190*a*, 190*b* may be sufficient to provide all the required electronic signaling (e.g., control signals and data output signals) between the ASIC 130 and the carrier board 60 as well as to provide all the required power to the ASIC 130.

In various embodiments, a subset of the TSVs 190*b* (i.e., data transmission TSVs 190*b*) may be used for transmitting data output signals (e.g., signals representing photon count data from one or more signal processing channels 135) from the ASIC 130 to an external component, such as an above-described processor 140 (e.g., FPGA). The remaining TSVs 190*a* may be used for other purposes, such as for providing power and/or control signals to the ASIC 130.

Figure 5:
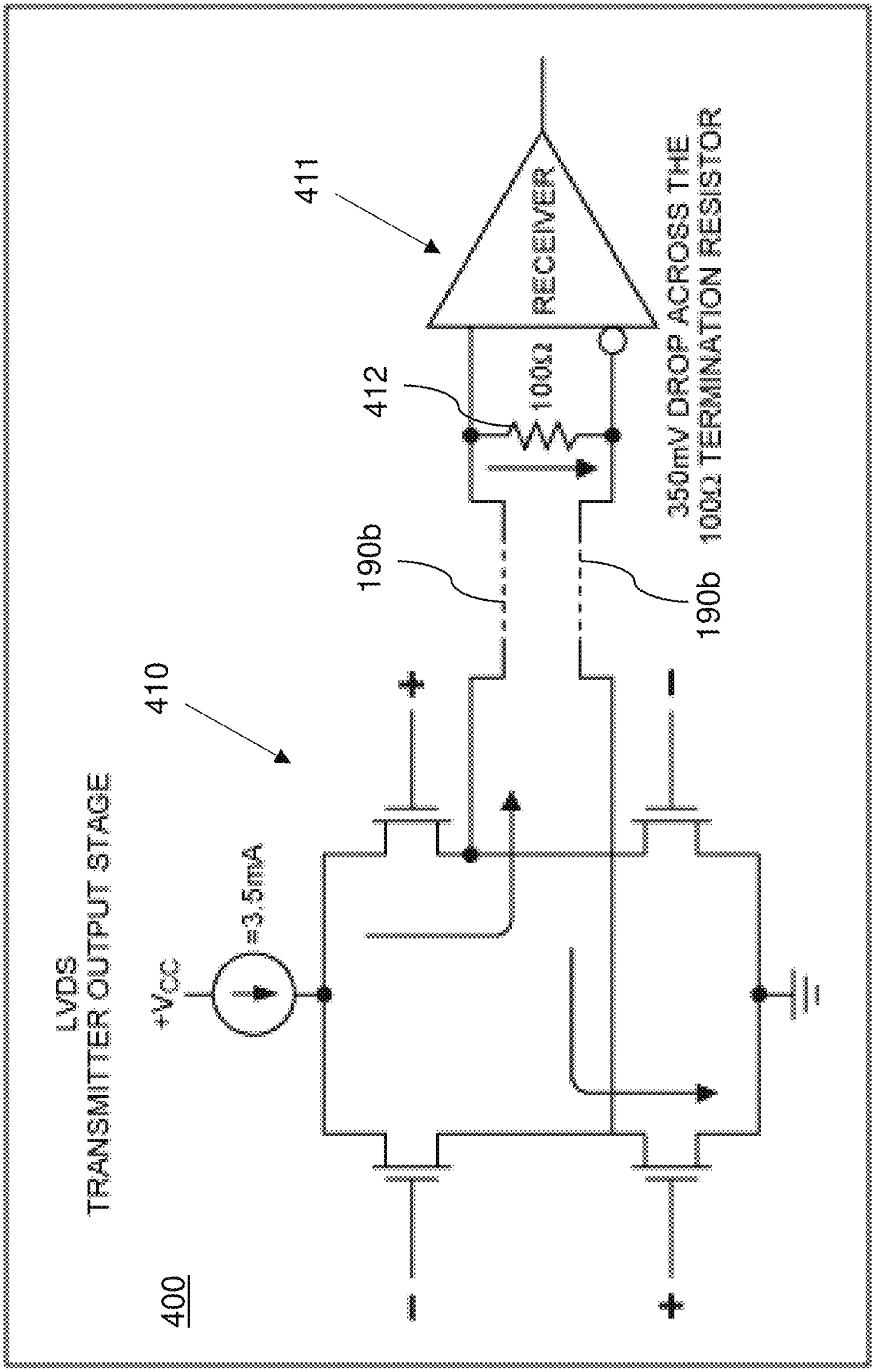
FIG. 5 is a circuit diagram schematically illustrating LVDS communications circuitry that may be used to transmit data from an ASIC to an external component.

In various embodiments, the data output signals may be transmitted from the ASIC 130 using a high-speed data communication protocol. In some embodiments, the data output signals may be transmitted using a differential signaling technique, such as low voltage differential signaling (LVDS). LVDS is a standard high-speed input/output transmission protocol that may be used to transmit photon count data from the ASIC 130. While embodiments with LVDS transmission protocol are described herein, it should be understood that other data transmission protocols may also be used. FIG. 5 is a circuit diagram schematically illustrating LVDS communications circuitry 400 that may be used to transmit data from an ASIC 130 to an external component. The LVDS communications circuitry 400 includes transmitter circuitry 410 that may be located on the ASIC 130 and receiver circuitry 411 that may be located on an external component, such as the above-described carrier board 60. The transmitter circuitry 410 may include, for example, driver circuitry, data aggregation circuitry to temporarily store the transmitted image data, and in some cases clock circuitry. The transmitter circuitry 410 may be located in a pixel region 180 of the ASIC. The transmitter circuitry 410 and the receiver circuitry 411 may be connected by a pair of complementary signal paths, where each of the signal paths may include a separate data transmission TSV 190*b*. Accordingly, each instance of an LVDS communications circuitry 400 on an ASIC 130 may include a pair of data transmission TSVs 190*b*. At the receiver end (e.g., the carrier board 60), the pair of signal paths may be connected across a resistor 412 located in the receiver circuitry 411.

To transmit data from the ASIC 130 to the external component (e.g., the carrier board 60), the transmitter circuitry 410 on the ASIC 130 may inject a constant current along one of the signal paths (e.g., using an H-bridge) with the return current (having an opposite polarity) returning to the transmitter circuitry 410 via the other signal path. The receiver circuitry 411 may measure the voltage drop across the resistor 412. As the path for the current from the transmitter circuitry 410 changes from one signal path to another, the direction of the current flow through the resistor 412 reverses. The direction of the current through the resistor 412 determines whether a positive or negative differential voltage is read by the receiver circuitry 411, where a positive differential voltage represents a first logic state and a negative differential voltage represents the second, complementary logic state.

Signal cross-talk may be a significant issue for spectral photon counting (SPC) detectors, such as an above-described photon counting computed tomography (PCCT) detector. One reason for this is that individual photon interaction events occurring within the radiation sensor 121 produce extremely small signals, such as electrical charges in the femtocoulomb (fC) range and voltage signals of 1 mV or less. As discussed above, these detection signals are received at the input nodes 133 (e.g., bonding pads) of the respective signal processing channels 135 and are then provided to the input of an amplifier 131 having a relatively high gain (e.g., ~60 db in some cases). In some cases, signal switching in the ASIC 130 may become capacitively coupled to the amplifier inputs, which may result in distorted signals or even false photon detection counts.

In the case of differential signaling data transmission circuitry, such as the LVDS circuitry 400 described above, a large amount of signal switching occurs during readout operations in which photon count data is transmitted from the ASIC 130 to an external component. During data transmission, the voltage "swing" that occurs within the pair of data transmission TSV 190*b* is generally much larger than the magnitude of the detection signals received at the signal processing channels 135 of the ASIC 130. In many cases, the voltage swing may be ~200 mV. This voltage swing may become capacitively coupled to the signal processing channels 135 resulting in cross-talk between the data transmission circuitry and the signal processing circuitry of the ASIC 130. In some cases, a capacitance as low as 0.5 femtofarads (fF) between a data transmission TSV 190*b* and the input to the amplifier 131 in a neighboring pixel region 180 may introduce a significant noise contribution due to parasitic capacitive coupling. At higher capacitances, such as ≥3 fF, the parasitic capacitive coupling between the data transmission TSVs 190*b* and the neighboring signal processing channels 135 may result in false photon detection counts.

This problem of capacitive coupling is particularly acute in a direct attach radiation detector unit 210 as shown in FIG. 4 due to the limited real estate on the ASIC 130, meaning that the data transmission TSVs 190*b* may be located within the pixel regions 180 of the ASIC 130 in close proximity to the inputs to the amplifiers 131 of the neighboring signal processing channels 135. The TSVs 190*b* may be located along the edges or corner regions of the pixel regions 180, meaning that each of the TSVs 190*b* may negatively affect the performance of multiple (e.g., 2, 4, or more) neighboring signal processing channels 135. This issue may be further exacerbated by the presence of underfill material 192 located between the back side surface of the radiation sensor 121 and the front side surface of the ASIC 130, which can increase the capacitive coupling between the TSVs 190 and the neighboring signal processing channel 135.

Various embodiments include a direct attach spectral photon counting (SPC) radiation detector 120 with reduced cross-talk between the data transmission circuitry and the signal processing circuitry of the ASIC 130.

Figure 6:
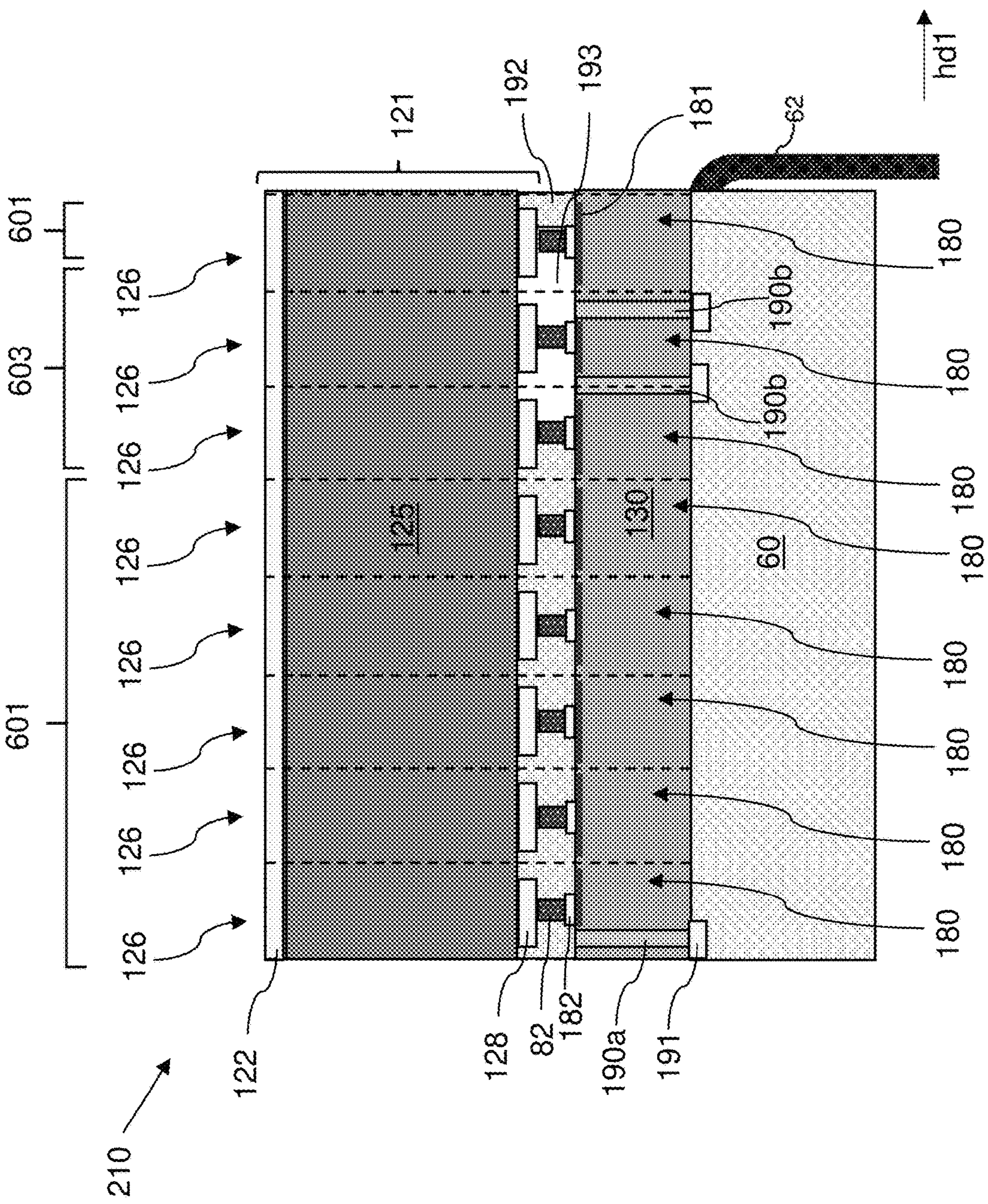
FIG. 6 is a vertical cross-sectional view of a radiation detector unit including a radiation sensor directly attached to an ASIC, where a first region of the radiation detector unit includes an underfill material between the back side surface of the radiation sensor and the front side surface of the ASIC, and a second region of the radiation detector unit including data transmission TSVs does not include an underfill material located the back side surface of the radiation sensor and the front side surface of the ASIC according to an embodiment of the present disclosure.

FIG. 6 is a vertical cross-sectional view of a radiation detector unit 210 of a first embodiment including a radiation sensor 121 directly attached to an ASIC 130, where a first region 601 of the radiation detector unit 210 includes an underfill material 192 between the back side surface of the radiation sensor 121 and the front side surface of the ASIC 130, and a second region 603 of the radiation detector unit 210 including data transmission TSVs 190*b* does not include an underfill material 192 located the back side surface of the radiation sensor 121 and the front side surface of the ASIC 130. Referring to FIG. 6, in the first embodiment, the underfill material 192 may be selectively applied between the back side surface of the radiation sensor 121 and the front side surface of the ASIC 130 such that the underfill material 192 is present in one or more first regions 601 of the radiation detector unit 210 but is not present in one or more second regions 603 of the radiation detector unit 210. The one or more second regions 603 may include region(s) in which data transmission TSVs 190*b* are located. In some embodiments, the one or more second regions 603 may include void areas or air gaps between the back side surface of the radiation sensor 121 and the front side surface of the ASIC 130. This may help to minimize capacitive coupling between the data transmission TSVs 190*b* and the signal processing circuitry 135 of the ASIC 130, since the air gap 193 provides a lower capacitive coupling than the underfill material 192.

In some embodiments, the underfill material 192 may be applied as a liquid and subsequently cured. This may make it difficult to control the location of the underfill material 192 within the radiation detector unit 210 so that it does not flow into the second region(s) 603 containing the data transmission TSVs 190*b*. Accordingly, in some embodiments, a sacrificial material may be provided between the back side surface of the radiation sensor 121 and the front side surface of the ASIC 130 in the one or more second regions 603 of the radiation detector unit 210. The sacrificial material may include any suitable material that may be applied locally within the one or more second regions 603 of the radiation detector unit 210 and may be selectively removeable (e.g., selectively dissolvable using suitable chemical solvent(s)) with respect to the underfill material 192.

Figure 7A:
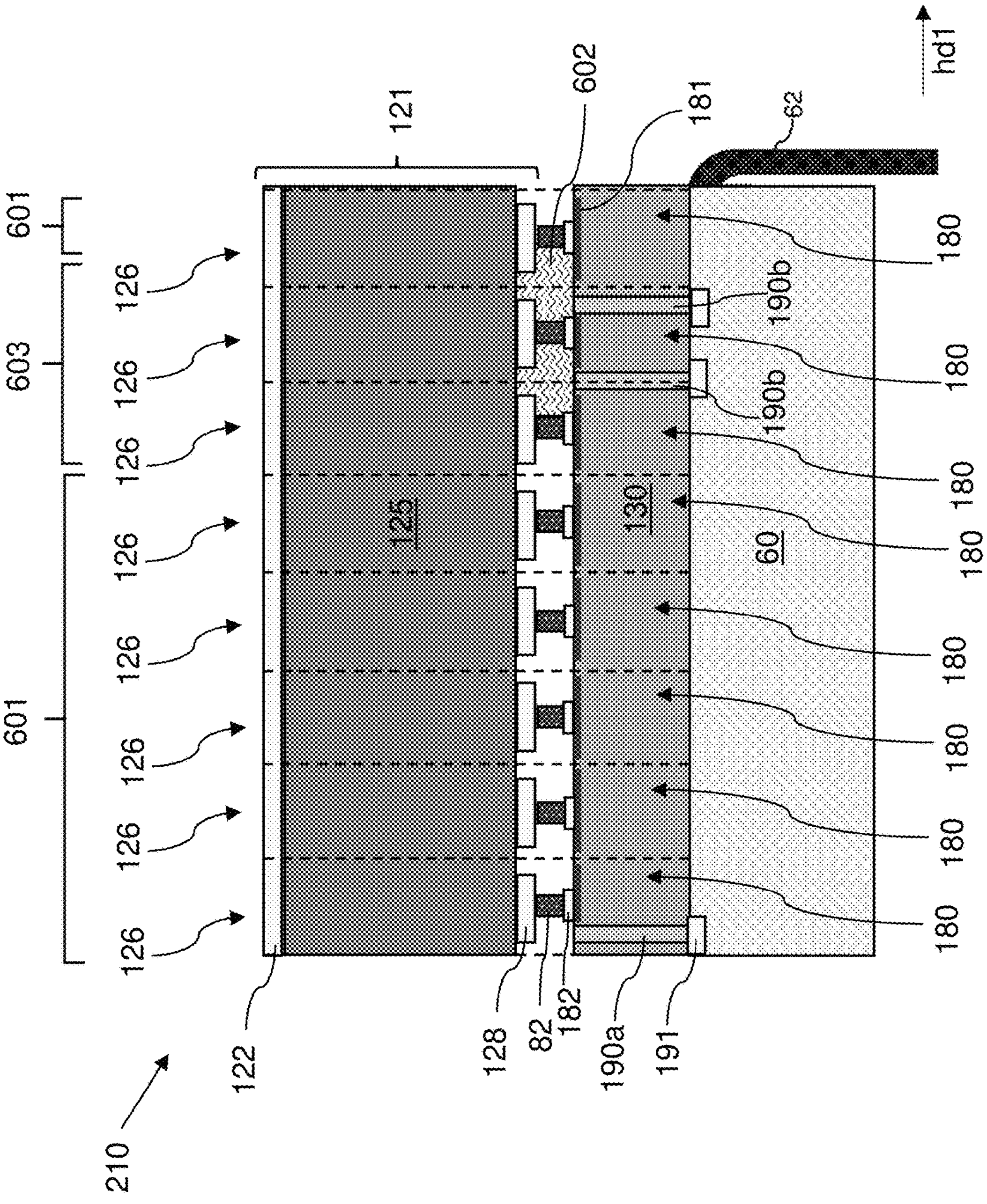
FIGS. 7A-7C are vertical cross-sectional views of a radiation detector unit illustrating a method for selective application of an underfill material according to an embodiment of the FIG. 8A illustrates the front side of an ASIC including an array of unit cells including a subset of unit cells that are inactive unit cells.
Figure 7B:
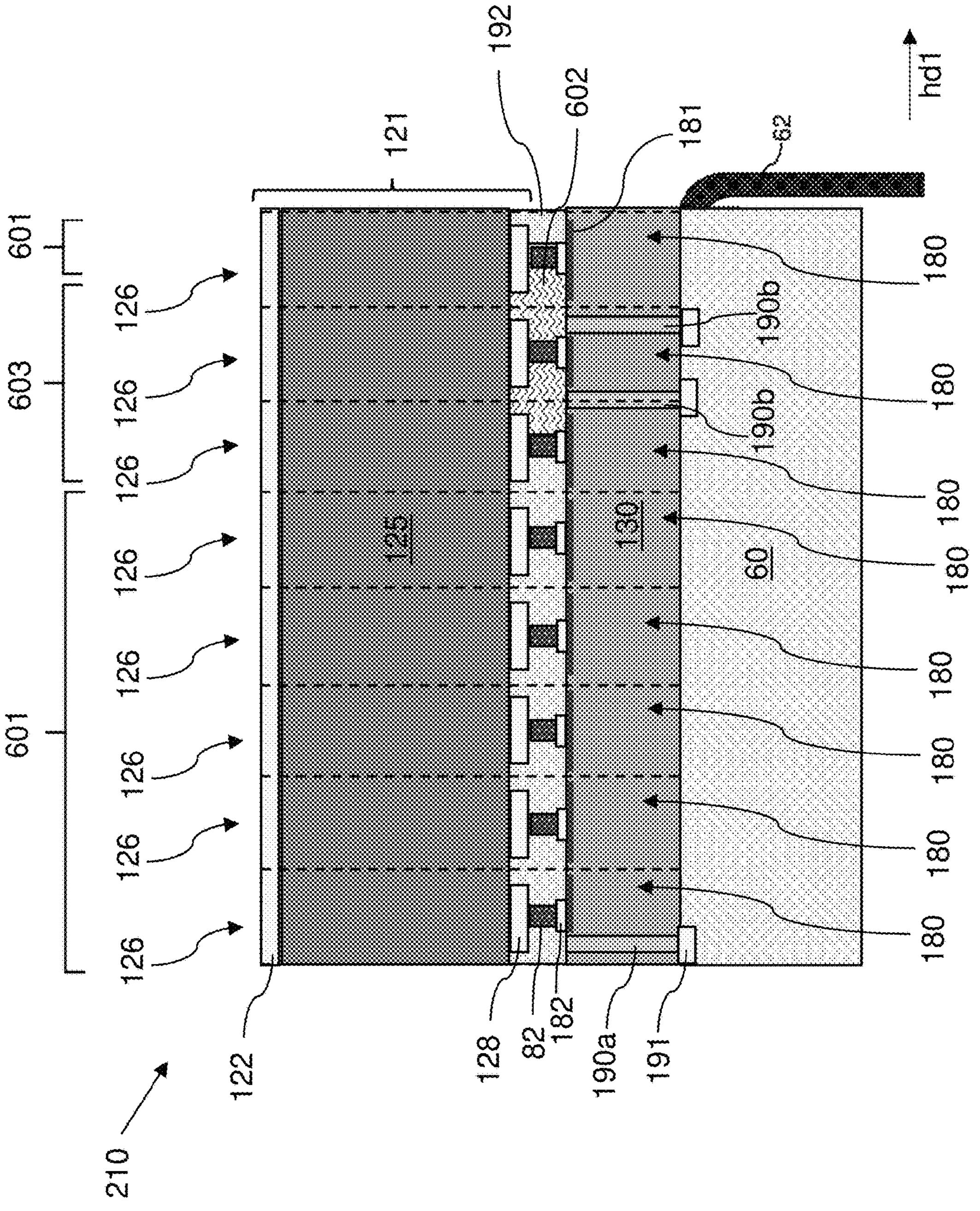
Figure 7C:
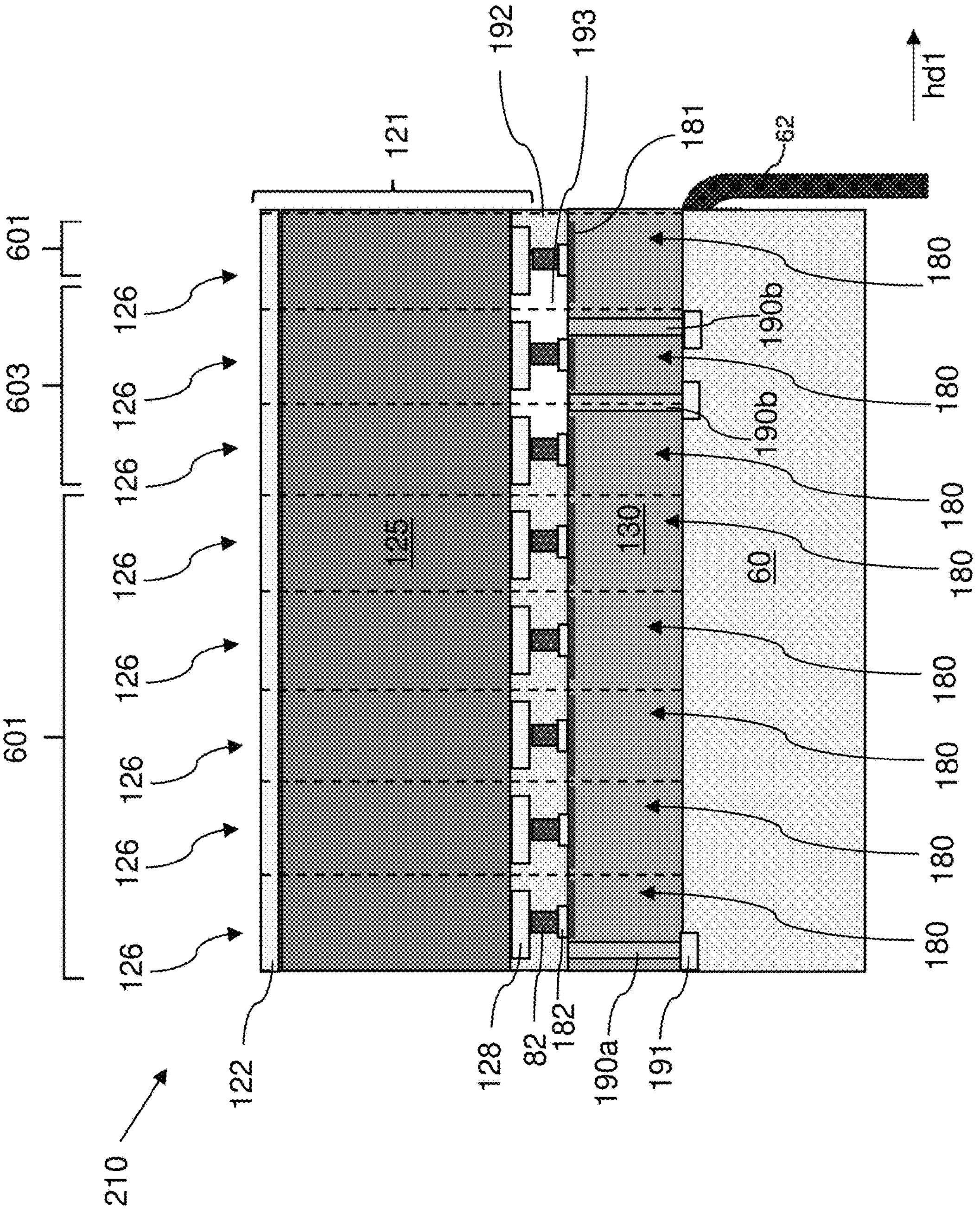

FIGS. 7A-7C are vertical cross-sectional views of a radiation detector unit 210 illustrating a method for selective application of an underfill material 192 according to the first embodiment of the present disclosure. Referring to FIG. 7A, the sacrificial material 602 may be selectively applied between the back side surface of the radiation sensor 121 and the front side surface of the ASIC 130 in one or more second regions 603 of the radiation detector unit 210 that include data transmission TSVs 190*b*.

Referring to FIG. 7B, an underfill material 192 may be applied within the remaining space (e.g., the first region(s) 601) between the back side surface of the radiation sensor 121 and the front side surface of the ASIC 130. The sacrificial material 602 may prevent the underfill material 192 from extending into the one or more second regions 603 of the radiation detector unit 210 that include the data transmission TSVs 190*b*.

Referring to FIG. 7C, the sacrificial material 602 may be selectively removed from the radiation detector 210 to provide a radiation detector 210 that includes underfill material 192 in one or more first regions 601 of the radiation detector unit 210 and void regions or air gaps 193 between the back side surface of the radiation sensor 121 and the front side surface of the ASIC 130 in the one or more second regions 603 of the radiation detector unit 210 that include the data transmission TSVs 190*b*. In some embodiments, the sacrificial material 602 may be dissolved using a chemical solvent (i.e., etchant) that selectively dissolves the sacrificial material 602 at a significantly higher rate (e.g., at least 5 times faster, such as at least 100 times faster) than the underfill material 192. Other suitable processes for selective removal of the sacrificial material 602 are within the contemplated scope of the disclosure.

Figure 8A:
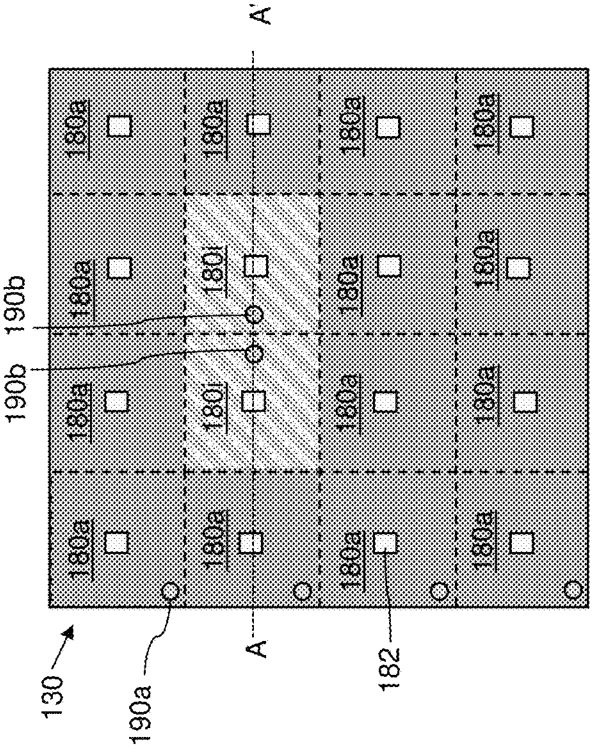
FIG. 8B is a vertical cross-section view of a portion of a radiation detector unit including a radiation sensor mounted over the front side of the ASIC of FIG. 8A according to an embodiment of the present disclosure.
Figure 8B:
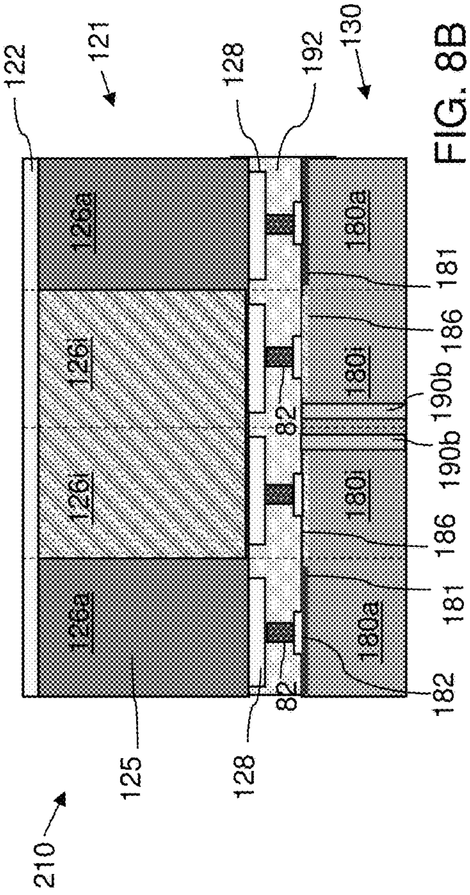

In a second embodiment, one or more unit cells 180 of the ASIC 130 that contain or are in proximity to a data transmission TSV 190*b* may be inactive unit cells that do not output photon count data for the pixel detectors 126 that overlie the respective inactive unit cells. FIG. 8A illustrates the front side of an ASIC 130 including an array of unit cells 180 including a subset of unit cells 180 that are inactive unit cells 180*i*. FIG. 8B is a vertical cross-section view of a portion of a radiation detector unit 210 including a radiation sensor 121 mounted over the front side of the ASIC 130 of FIG. 8A according to the second embodiment of the present disclosure. The cross-section view of FIG. 8B is taken along line A-A' in FIG. 8A.

Referring to FIGS. 8A and 8B, the radiation sensor 121 and ASIC 130 of the radiation detector unit 210 may have similar constructions as the radiation sensor 121 and the ASIC 130 described above with reference to FIG. 4, and thus repeated discussion of like elements is omitted for brevity. In the second embodiment of FIGS. 8A-8B, the unit cells 180*i* of the ASIC 130 that contain a data transmission TSV 190*b* do not output valid photon count data, and are therefore referred to as the "inactive unit cells" 180*i*. The remaining unit cells 180 of the ASIC 130 may output valid photon count data and thus may be "active unit cells" 180*a*.

In some embodiments, the circuit regions in the inactive unit cells 180*i* may be powered down (i.e., electrical power is not provided to the circuit regions in the inactive unit cells 180*i*) to avoid unnecessary power dissipation. Thus, the circuit regions including the signal processing channel circuitry in the inactive unit cells 180*i* may be referred to as inactive circuit regions 186 that do not output photon count data. In alternative embodiments, the inactive unit cells 180*i* that contain or are proximate to a data transmission TSV 190*b* may not include signal processing channel circuitry and/or may not be electrically coupled to a pixel detector 126 via a bonding material portion 82, and are therefore incapable of outputting photon count data. In other embodiments, the inactive unit cells 180*i* may include signal processing channel circuitry that generates photon count data that may be rejected or discarded (i.e., not used in subsequent image processing operations) and thus may not be considered as valid photon count data. In any of these cases, the photon interaction events that occur within the pixel detectors 126 overlying the inactive unit cells 180*i* are not included in the total photon count data obtained by the detector array, and therefore these pixel detectors 126 may be considered to be "inactive pixel detectors" 126*i*.

In the second embodiment, by providing at least one inactive unit cell 180*i* near the location of a data transmission TSV 190*b*, faulty or distorted photon count data resulting from capacitive coupling between the TSV 190*b* and the signal processing channel circuitry 135 of the ASIC 130 may be minimized or avoided. FIGS. 8A and 8B illustrate an embodiment ASIC 130 including two inactive unit cells 180*i*, where each inactive unit cell 180*i* contains a data transmission TSV 190*b*. It will be understood that an ASIC 130 may include only a single inactive unit cell 180*i*, or more than two inactive unit cells 180*i* (e.g., 3, 4 or more inactive unit cells 180*i*). In some cases, an inactive unit cell 180*i* may not contain a data transmission TSV 190*b*, but may be located sufficiently close to a data transmission TSV 190*b* that capacitive coupling with the data transmission TSV 190*b* is likely to result in distorted photon count data.

The radiation detector unit 210 of FIGS. 8A and 8B may include an underfill material 192 extending continuously between the front side surface of the ASIC 130 and the back side surface of the radiation sensor 121. In other embodiments, the underfill material 192 may not extend over region(s) of the radiation detector unit 210 that include a data transmission TSV 190*b*, as described above with reference to the first embodiment illustrated in FIGS. 6-7C. In still other embodiments, the underfill material 192 between the front side surface of the ASIC 130 and the back side surface of the radiation sensor 121 may be omitted entirely.

In the second embodiment of FIGS. 8A and 8B, the inactive unit cells 180*i* are located in a central region of the radiation detector unit 210. This may simplify the routing of signals between the active unit cells 180*a* and the transmitter circuitry 410 and the data transmission TSVs 190*b* on the ASIC 130. However, some of the image data from the center of the radiation detector unit 210 will be lost.

Figure 9A:
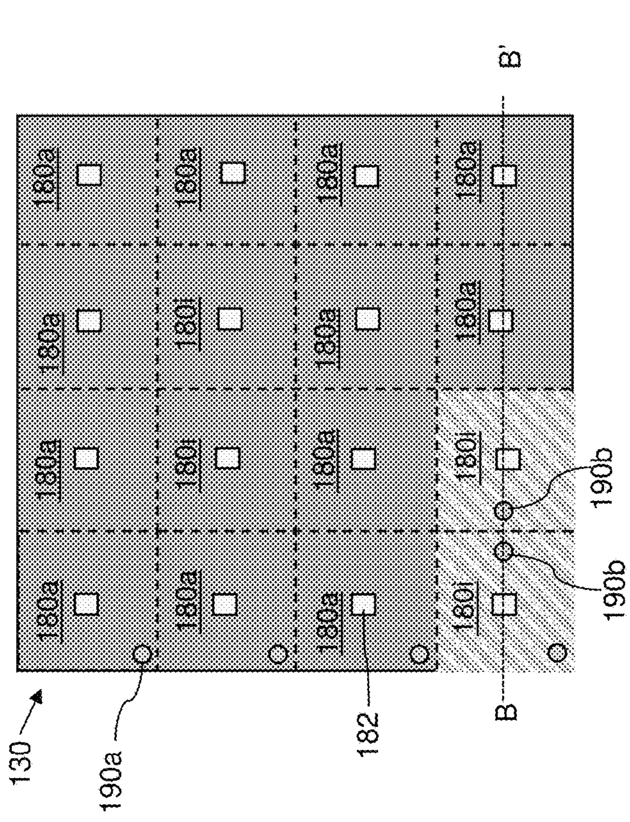
FIG. 9A illustrates the front side of an ASIC including an array of unit cells including inactive unit cells located in a corner of the ASIC.
Figure 9B:
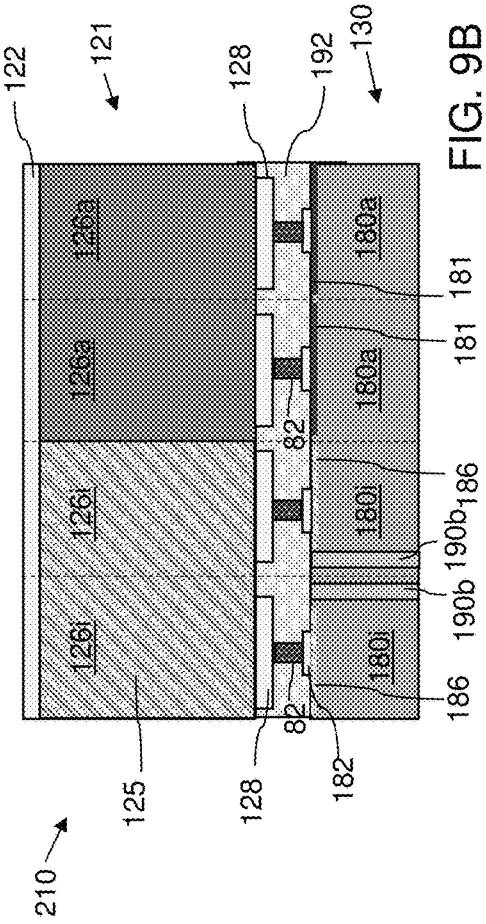
FIG. 9B is a vertical cross-section view of a portion of a radiation detector unit including a radiation sensor mounted over the front side of the ASIC of FIG. 9A according to an embodiment of the present disclosure.

Alternatively, in the third embodiment, the inactive unit cells 180*i* may be located in a corner or edge region of the radiation detector unit 210. FIG. 9A illustrates the front side of an ASIC 130 including an array of unit cells 180 including inactive unit cells 180*i* located in a corner of the ASIC 130. FIG. 9B is a vertical cross-section view of a portion of a radiation detector unit 210 including a radiation sensor 121 mounted over the front side of the ASIC 130 of FIG. 9A according to the third embodiment of the present disclosure. The cross-section view of FIG. 9B is taken along line B-B' in FIG. 9A.

Referring to FIGS. 9A and 9B, the data transmission TSVs 190*b* are located in the lower left corner of the radiation detector unit 210. The unit cells 180 of the ASIC 130 that contain the data transmission TSVs 190*b* are inactive unit cells 180*i*, while the remainder of the unit cells 180*i* may be active unit cells 180*a*. Locating the inactive unit cells 180*i* in the corners or along the edges of the radiation detector unit 210 may be advantageous because the pixel detectors 126 along the edges and in the corners of the radiation sensor 121 often exhibit relatively poorer performance than pixel detectors 126 in the center region of the radiation sensor 121. This may be due to imperfect or lack of passivation along the exposed semiconductor crystal walls and/or damage incurred during the wafer dicing process, among other factors. By providing inactive unit cells 180*i* underlying relatively poorer performing edge and/or corner pixel detectors 126 rather than relatively better performing center pixel detectors 126, the overall image quality of the detector array may be improved. A potential trade-off is that the routing of the data signals to the transmitter circuitry 410 and the data transmission TSVs 190*b* located along an edge or corner of the ASIC 130 may be more complex.

Figure 10A:
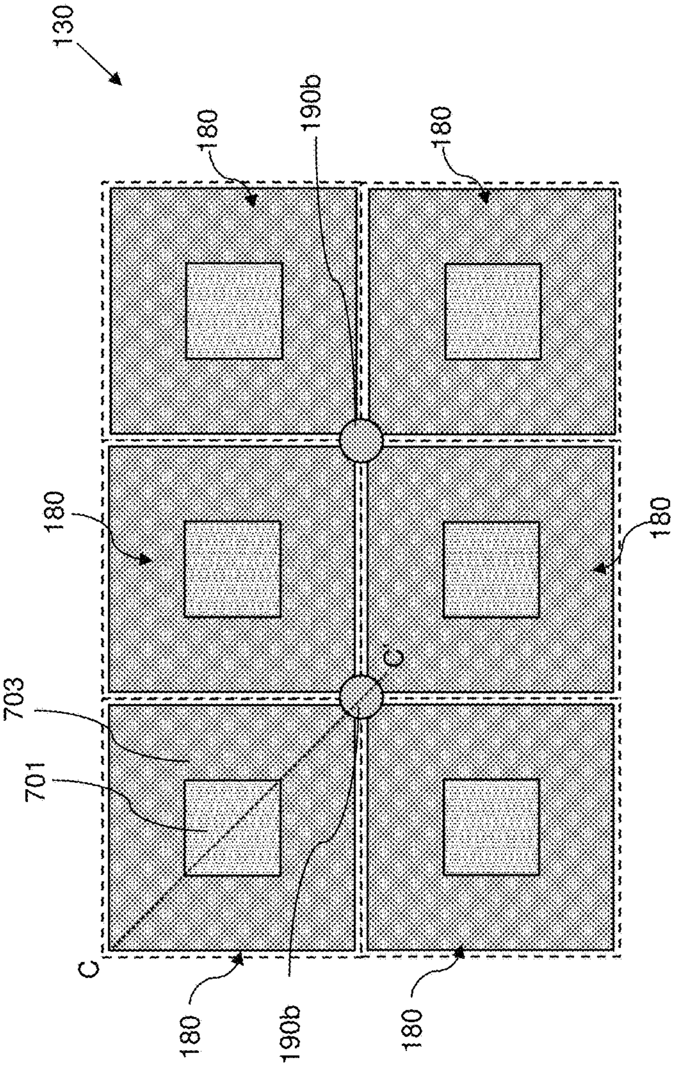
FIG. 10A is a plan view of a portion of an ASIC for a radiation detector unit according to an embodiment of the present disclosure.
Figure 10B:
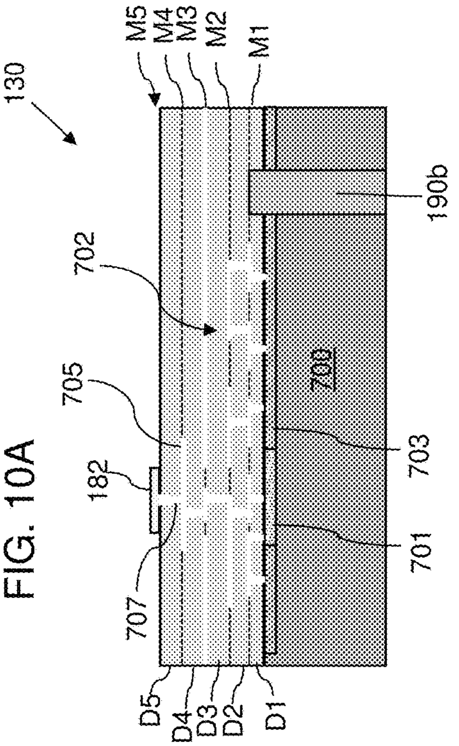
FIG. 10B is a vertical cross-section view of the portion of the ASIC taken along line C-C' in FIG. 10A.

FIG. 10A is a plan view of a portion of an ASIC 130 for a radiation detector unit 210 of the fourth embodiment. FIG. 10B is a vertical cross-section view of the portion of the ASIC 130 taken along line C-C' in FIG. 10A. Referring to FIGS. 10A and 10B, four unit cells 180 of an ASIC 130 are illustrated. Each unit cell 180 may include signal processing circuitry including analog circuitry 701 and digital circuitry 703. Detection signals from pixel detectors 126 overlying each of the unit cells 180 may be initially processed by the analog circuitry 701 including an above-described amplifier 131 and may then be processed by the digital circuitry 703. The resulting digital detection signals (i.e., photon count data) may then be provided to above-described transmitter circuitry 410 (not shown in FIGS. 10A and 10B) for transmission to an external component (e.g., carrier board 60) via data transmission TSVs 190*b*. FIG. 10A illustrates a pair of data transmission TSVs 190*b* for transmitting the digital detection signals via a differential signaling (e.g., LVDS) technique. The data transmission TSVs 190*b* in FIG. 10A are located in corner regions where four adjacent unit cells 180 meet, although it will be understood that other locations for the data transmission TSVs 190*b* may be utilized.

In the fourth embodiment shown in FIG. 10A and 10B, the analog circuitry 701 is located in the central region of each unit cell 180 and the data transmission TSVs 190*b* are located in corner regions of the unit cells 180. The digital circuitry 703 may surround the analog circuitry 701 such that the digital circuitry 703 is located between the analog circuitry 701 and the TSVs 190*b*. Surrounding the analog circuitry 701 with the digital circuitry 703 may minimize capacitive coupling between the digital circuitry 703 and the input to the amplifier 131 in the analog circuitry 701. Further, by maximizing the distance between the analog circuitry 701 and the TSVs 190*b*, the capacitive coupling between the analog circuitry 701 and the TSVs 190*b* may be minimized. The above-described transmitter circuitry 410 may be located in one or more of the unit cells 180, such as within the digital circuity 703 of the unit cell(s) 180. Each of the unit cells 180 shown in FIGS. 10A and 10B may be an active unit cell 180*a* or an inactive unit cell 180*i* as described above with reference to FIGS. 8A-9B.

In various embodiments, the analog circuitry 703 and the digital circuitry 703 in each of the unit cells 180 may include a plurality of devices disposed on and/or in the front side surface of a semiconductor (e.g., silicon) substrate 700. The plurality of devices may include integrated circuit devices. The devices may include, for example, transistors (e.g., field-effect transistors (FETs)), capacitors, resistors, diodes, fuse devices, or other similar devices. Redistribution structures 702 may be located over the front side surface of the semiconductor substrate 700 and over the devices located on and/or in the front side surface of the semiconductor substrate 700. The redistribution structures 702 may include metal interconnect features embedded in a dielectric material matrix. The metal interconnect features may include horizontally-extending metal features 705 (e.g., metal lines and/or pads) located in respective metal levels (e.g., M1 through M5) separated by layers of dielectric material (e.g., D1 through D5). Conductive vias 707 may extend vertically through the layers of dielectric material D1-D5 to electrically connect metal features 705 in the different metal levels M1-M5 and to electrically connect the metal features 705 to the underlying devices disposed on and/or in the front side surface of the semiconductor substrate 700. The uppermost metal level (e.g., M5 in FIG. 10B) may include the above-described contact regions 182 (e.g., bond pads) that receive the detection signals from the corresponding pixel detectors 126 of the overlying radiation sensor 121. Metal features in the redistribution structures 702 may electrically couple the contact regions 182 to the inputs to the amplifiers 131 in the analog circuitry 701 in each of the unit cells 180. The metal features in at least one metal level of the redistribution structures (e.g., metal level M3 in FIG. 10B) may also include a grounded conductive feature (e.g., ground plane) to minimize capacitive coupling between the contact regions 126 and the underlying digital circuitry 703.

In various embodiments, the top surfaces of data transmission TSVs 190*b* may not extend above the lowermost metal level (i.e., M1) of the redistribution structures 702. This may help to reduce the amount of capacitive coupling between the data transmission TSVs 190*b* and the detection signals transmitted from the contact regions 126 through the metal features (e.g., metal lines 705 and vias 707) to the input of the amplifier 131 in the analog circuitry 701.

Figure 11A:
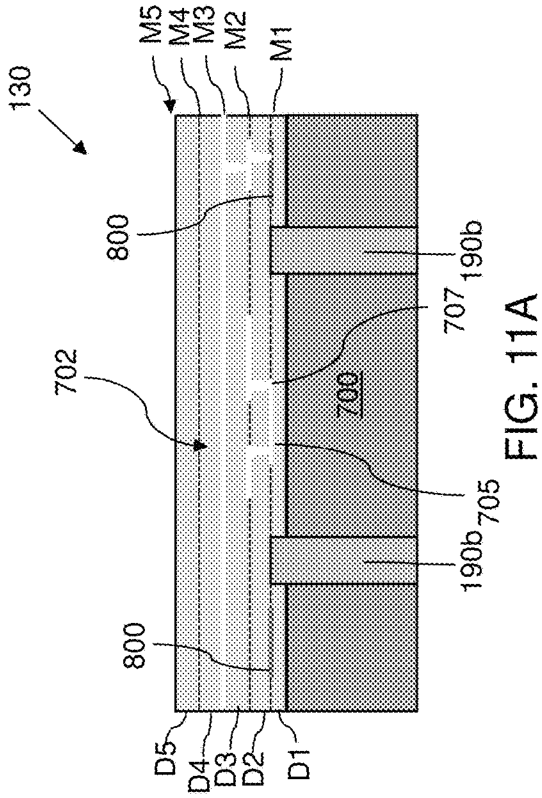
FIG. 11A is a vertical cross-section view of a portion of an ASIC illustrating a metal guard ring laterally surrounding a pair of data transmission TSVs according to an embodiment of the present disclosure.
Figure 11B:
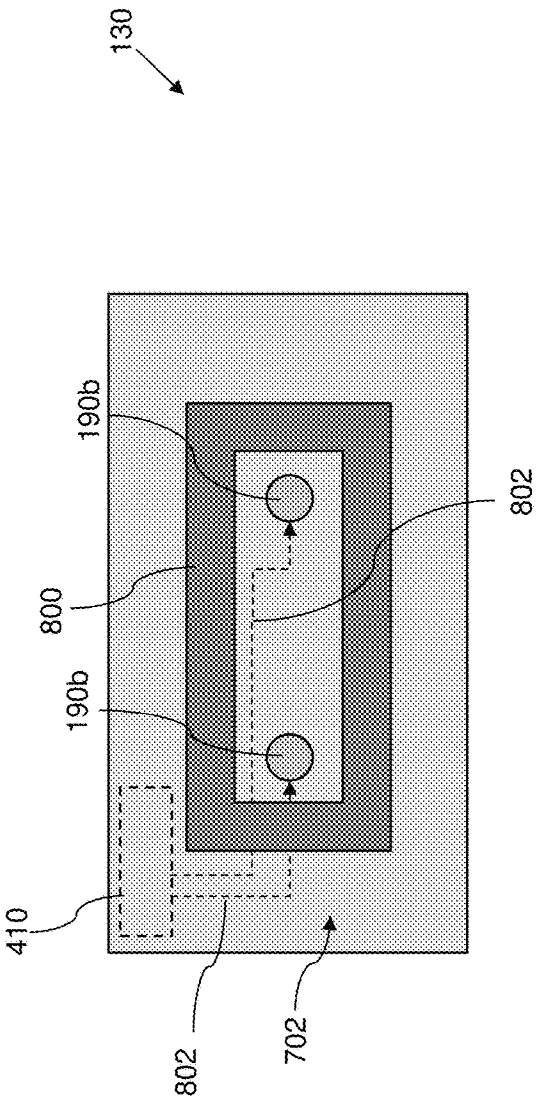
FIG. 11B is a horizontal cross-section view of the portion of the ASIC of FIG. 11A.

In the fifth embodiment, the capacitive coupling between the data transmission circuitry and the signal processing circuitry of an ASIC 130 may be reduced by providing a grounded conductive feature laterally surrounding a data transmission TSV 190*b*. FIG. 11A is a vertical cross-section view of a portion of the ASIC 130 illustrating a metal guard ring 800 laterally surrounding a pair of data transmission TSVs 190*b* according to the fifth embodiment of the present disclosure. FIG. 11B is a horizontal cross-section view of the portion of the ASIC 130 of FIG. 11A.

Referring to FIGS. 11A and 11B, the guard ring 800 may laterally surround at least one data transmission TSV 190*b* of the ASIC 130. The guard ring 800 may include a suitable conductive (e.g., metallic) material, such as copper. In some embodiments, the guard ring 800 may be formed of the same material(s) as the metal features 705, 707 of the redistribution structures 702 and may be formed using the same processes used to form the metal features 705, 707 of the redistribution structures 702. The guard ring 800 may be embedded in the dielectric material of the redistribution structures 702 such that the guard ring 800 may be separated from the at least one data transmission TSV 190*b* by the dielectric material of the redistribution structures 702. The guard ring 800 may be electrically connected to a ground voltage (Vss) of the ASIC 130. Accordingly, the guard ring 800 may help to shield and thus reduce the capacitive coupling between the data transmission TSVs 190*b* and the signal processing circuitry of the neighboring unit cells 180 of the ASIC 180.

In the fifth embodiment, the guard ring 800 may extend in a horizontal plane that includes the upper surface of the at least one data transmission TSV 190*b*. That is, the guard ring 800 may extend around and laterally surround the top surface of the at least one data transmission TSV 190*b*. In some embodiments, the guard ring 800 may extend in a metal level M1-M5 of the redistribution structures 702 of the ASIC 130. FIG. 11B is a horizontal cross-section view along the plane of the lowermost metal level, M1, of the redistribution structures 702 illustrating the guard ring 800 extending around the top surfaces of a pair of data transmission TSVs 190*b* within the first metal level M1 of the redistribution structures 702. It will be understood that the guard ring 800 may extend in a different horizontal plane, such as in another metal level (e.g., M2-M5) or on and/or within the underling semiconductor substrate 700. Further, although FIGS. 11A and 11B illustrate a guard ring 800 surrounding a pair of data transmission TSVs 190*b*, it will be understood that in other embodiments a guard ring 800 may surround a single data transmission TSV 190*b* or more than two data transmission TSVs 190*b*.

FIG. 11B schematically illustrates the above-described transmitter circuitry 410 and the conductive signal lines 802 used to transmit data signals between the transmitter circuitry 410 and the respective data transmission TSVs 190*b*. The signal lines 802 may extend in a horizontal plane that it located vertically above or below the plane of the guard ring 800 (e.g., within a different metal level of the redistribution structures 702 and/or over or within the substrate 700) to reach the data transmission TSVs 190*b*.

Figure 12A:
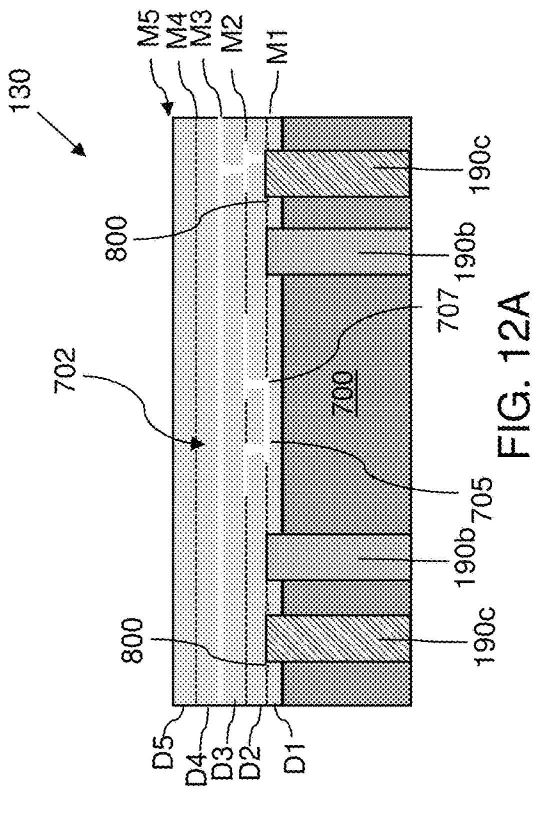
FIG. 12A is a vertical cross-section view of a portion of an ASIC illustrating a plurality of guard TSVs surrounding a pair of data transmission TSVs according to an embodiment of the present disclosure.
Figure 12B:
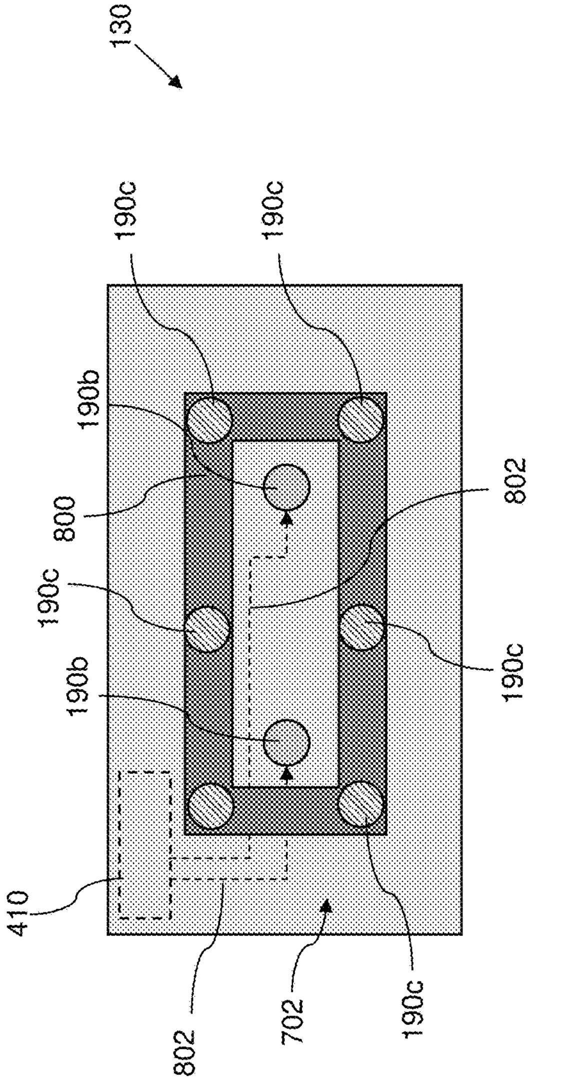
FIG. 12B is a horizontal cross-section view of the portion of the ASIC of FIG. 12A.

FIG. 12A is a vertical cross-section view of a portion of the ASIC 130 illustrating a plurality of guard TSVs 190*c* surrounding a pair of data transmission TSVs 190*b* according to the sixth embodiment of the present disclosure. FIG. 12B is a horizontal cross-section view of the portion of the ASIC 130 of FIG. 12A. Referring to FIGS. 12A and 12B, at least one guard TSV 190*c* may be located adjacent to one or more data transmission TSVs 190*b* of the ASIC 130. In some embodiments, such as shown in FIGS. 12A and 12B, a plurality of guard TSVs 190*c* may laterally surround the one or more data transmission TSVs 190*c*. The guard TSVs 190*c* may have a similar or identical construction and may be formed using the same process(es) as the data transmission TSVs 190*b*. In various embodiments, the guard TSVs 190*c* may not transmit data signals. The guard TSVs 190*c* may help to inhibit capacitive coupling between the data transmission circuitry and the signal processing circuitry of the ASIC 130 including along capacitive paths through the semiconductor substrate 700 of the ASIC 130. The guard TSVs 190*c* may be electrically connected to a ground voltage (Vss) of the ASIC 130. In some embodiments, the above-described guard ring 800 may be electrically coupled to each of the guard TSVs 190*c* and may laterally surround the at least one data transmission TSV 190*b*.

Figure 13:
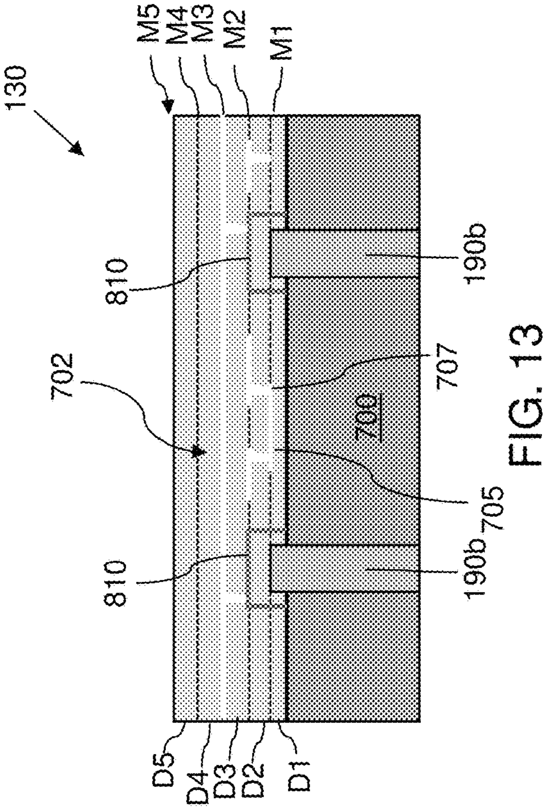
FIG. 13 is a vertical cross-section view of a portion of an ASIC illustrating a three-dimensional ground shield structure over a data transmission TSVs according to an embodiment of the present disclosure.

FIG. 13 is a vertical cross-section view of a portion of the ASIC 130 illustrating a three-dimensional ground shield structure 810 over a data transmission TSVs 190*b* according to the seventh embodiment of the present disclosure. Referring to FIG. 13, the ground shield structures 810 may be formed over one or more data transmission TSVs 190*b* of the ASIC 130. In some embodiments, such as shown in FIG. 13, a plurality of ground shield structures 810 may be formed over respective data transmission TSVs 190*b* of the ASIC 130. The ground shield structures 810 may be formed of a suitable conductive (e.g., metallic) material, such as copper. The ground shield structures 810 may be formed within the redistribution structures 702 of the ASIC 130. The ground shield structures 810 may include the same material (s) as the metal features 705, 707 of the redistribution structures 702 and may be formed using the same similar processes used to form the metal features 705, 707 of the redistribution structures 702. Accordingly, the ground shield structures 810 may be embedded in the dielectric material of the redistribution structures 702.

Each of the ground shield structures 810 includes an upper surface that extends horizontally over an upper surface of a respective data transmission TSV 190*b*, and side surfaces that extend vertically downward from the upper surface of the ground shield structure 810 to at least the horizontal plane containing the upper surface of the data transmission TSVs 190*b* (e.g., at least to metal level M1. In some embodiments, the side surfaces of the ground shield structures 810 may extend vertically below the plane containing the upper surface of the data transmission TSVs 190*b* such that the ground shield structures 810 may laterally surround at least a portion of the side surfaces of the data transmission TSVs 190*b*. In the seventh embodiment of FIG. 13, for example, the side surfaces of the ground shield structures 810 extend to the upper surface of the semiconductor substrate 700. In the eighth embodiment described in further detail below, the side surfaces of the ground shield structures 810 may extend into the semiconductor substrate 700.

The ground shield structures 810 may be electrically connected to a ground voltage (Vss) of the ASIC 130. The ground shield structures 810 may function similarly to a Faraday cage to electrically isolate the data transmission TSVs 190*b* located inside the ground shield structures 810 from the signal processing electronics in the neighboring unit cells 180. The ground shield structures 810 may include at least one opening in the upper and/or side surfaces of the ground shield structures 810 to accommodate the signal lines between the data transmission TSVs 190*b* and the transmitter circuitry.

Figure 14:
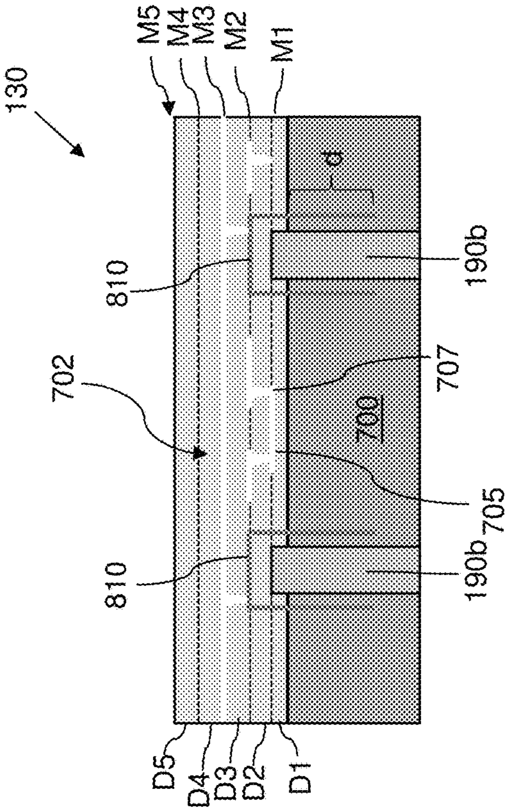
FIG. 14 is a vertical cross-section view of a portion of an ASIC illustrating a three-dimensional ground shield structure extending into a semiconductor substrate according to an embodiment of the present disclosure.

FIG. 14 is a vertical cross-section view of a portion of the ASIC 130 illustrating the eighth embodiment in which the three-dimensional ground shield structures 810 extend into the semiconductor substrate 700. Referring to FIG. 14, in the eighth embodiment, the side surfaces of the ground shield structures 810 may extend vertically below the front side surface of the semiconductor substrate 700 and into the semiconductor substrate 700 by a distance, d. The distance, d, may be greater than 0 μm up to the full thickness of the semiconductor substrate 700, such as between about 10 μm and about 250 μm deep below the surface of the semiconductor substrate 700. Without wishing to be bound by a particular theory, it is believed that a significant component of the capacitive coupling between the data transmission TSVs 190*b* and the signal processing circuitry of the unit cells 180 may be attributed to fringing from deeper portions of the TSV 190*b* through the semiconductor substrate 700 to the signal processing circuitry of the neighboring unit cells 180. By providing a ground shield structure that extends into the semiconductor substate 700 and laterally surrounds the TSV 190*b*, the capacitive coupling may be significantly reduced.

Figure 15A:
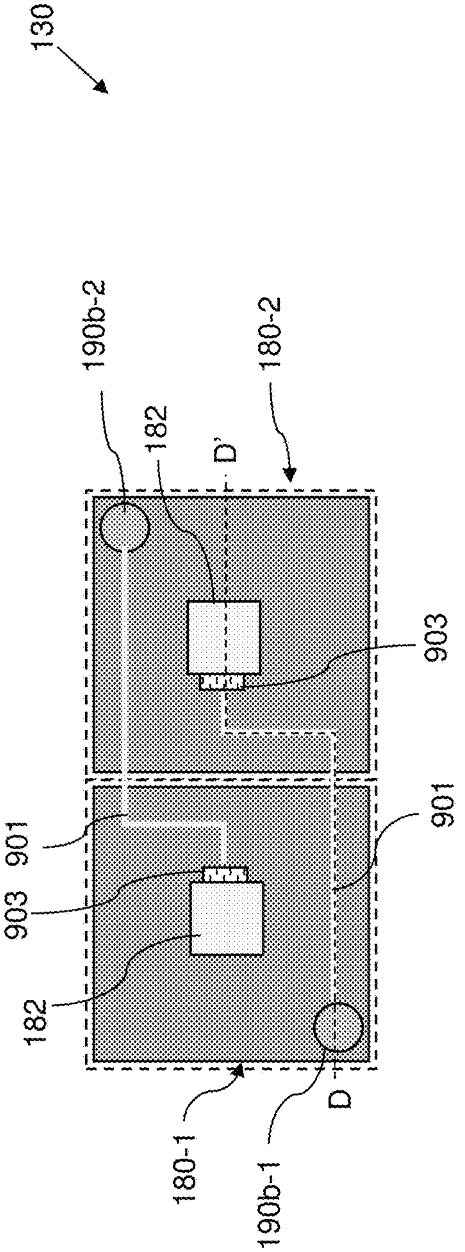
FIG. 15A is a plan schematic view of a portion of an ASIC including two adjacent unit cells having mirror capacitors according to an embodiment of the present disclosure.

The ninth embodiment includes a mirror compensation capacitor to cancel out the capacitive coupling between the data transmission TSVs 190*b* and the signal processing circuitry of the unit cells 180. FIG. 15A is a plan schematic view of two adjacent unit cells 180-1 and 180-2 according to the ninth embodiment of the present disclosure. Each unit cell 180-1 and 180-2 includes a data transmission TSV 190*b* of a pair of data transmission TSVs 190*b*-1 and 190-2 that are complementary to one another and are used to transmit data using differential signaling (e.g., LVDS). As used herein, the pair of data transmission TSVs 190*b* are "complementary" to one another where the polarity of the signals on a first TSV 190*b*-1 of the pair of data transmission TSVs 190*b* is always opposite to the polarity of the signal on the second TSV 190*b*-2 of the pair of data transmission TSVs 190*b*. Because the pair of TSVs 190*b* are complementary, when the voltage swings upwards on one of the data transmission TSVs 190*b*, there is a "mirror" downward voltage swing on the other data transmission TSV 190*a*. Accordingly, by adding additional capacitance of the opposite polarity to the signal lines that transmit the detection signals to the inputs to the amplifiers 131 in each of the unit cells 180-1 and 180-2, the effect of the capacitive coupling between the data transmission TSVs 190*b* and the signal processing circuitry in the nearest neighbor unit cell(s) 180 may be at least partially canceled.

Figure 15B:
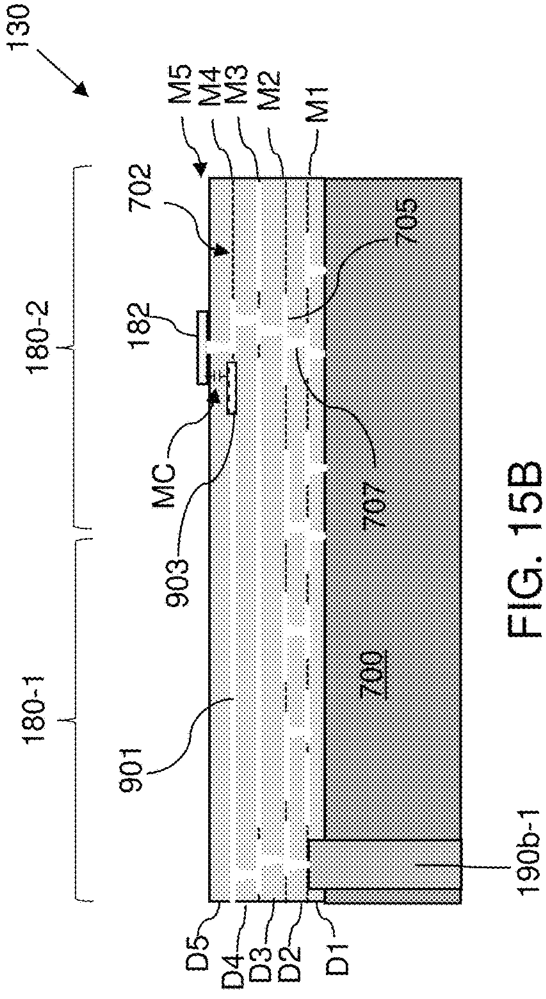
FIG. 15B is a vertical sectional cross-section view of a portion of an ASIC taken along line D-D' in FIG. 15A that illustrates an exemplary configuration of a mirror capacitor according to an embodiment of the present disclosure.

In the ninth embodiment of FIGS. 15A and 15B, a mirror capacitor MC may be provided by providing a signal line 901 electrically coupled to a first data transmission TSV 190*b*-1 located within or adjacent to a first unit cell 180-1 to a second unit cell 180-1 that contains or is in adjacent to a second data transmission TSV 190*b*-2 that is complementary to the first data transmission TSV 190*b*-1. FIG. 15A illustrates the signal line 901 extending from the first data transmission TSV 190*b*-1 to the second unit cell 180-2, although it will be understood that the signal line 901 may originate upstream of the first data transmission TSV 190*b*-1, such as from the transmitter circuitry 410 or from the signal line 802 that transmits the data signals from the transmitter circuitry 410 to the first data transmission TSV 190*b*-1. The signal line 901 may be electrically coupled to a metal feature 903 in the second unit cell 180-2. The metal feature 903 in the second unit cell 180-2 may be capacitively coupled to the signal line(s) that transmit detection signals to the input to the amplifier 131 in the signal processing channel circuitry of the second unit cell 180-2. Accordingly, a mirror capacitor (MC) may be provided within the second unit cell 180-2 that may at least partially cancel out the capacitive coupling between the second data transmission TSV 190*b*-2 and the signal processing channel circuitry in the second unit cell 180-2. A similar signal line 901 electrically coupled to the second data transmission TSV 190*b*-2 may extend to a metal feature 903 within the first unit cell 180-1 to provide an analogous mirror capacitor (MC) in the first unit cell 180-1 that may at least partially cancel out the capacitive coupling between the first data transmission TSV 190*b*-1 and the signal processing channel circuitry in the first unit cell 180-1.

FIG. 15B is a vertical sectional cross-section view of a portion of an ASIC 130 taken along line D-D' in FIG. 15A that illustrates an exemplary configuration of a mirror capacitor (MC). Referring to FIGS. 15A and 15B, the signal line 901 coupled to the first data transmission TSV 190*b*-1 and extending into the second unit cell 180-2 may include a conductive trace (e.g., metal line(s) and/or via(s)) located within the redistribution structures 702 of the ASIC 130. The metal feature 903 may be a plate-like conductive member that at least partially underlies the contact region 182 (e.g., bonding pad) of the second unit cell 180-2. The dielectric material of the redistribution structures 702 may be located between the contact region 182 and the metal feature 903. Accordingly, the mirror capacitor (MC) may be a parallel-plate capacitor formed between the contact region 182 and the metal feature 903. A corresponding signal line 901 electrically coupled to the second data transmission TSV 190*b*-1 may extend within the redistribution structures 702 to a metal feature 903 in the first unit cell 180-2 to provide an analogous parallel-plate mirror capacitor MC in the first unit cell 180-1.

Referring again to FIGS. 15A and 15B, the parameters of the mirror capacitor (MC), including the distance between the contact region 182 and the metal feature 903, the area of overlap between the contact region 182 and the metal feature 903, and the permittivity & of the dielectric material located between the contact region 182 and the metal feature 903, may be designed such that the capacitance between the contact region 182 and the metal feature 903 may be approximately equal to the complementary parasitic capacitance between the second data transmission TSV 190*b*-2 and the input to the amplifier 131 of the signal processing circuitry in the second unit cell 180. Accordingly, the effect of the parasitic capacitance from second data transmission TSV 190*b*-2 may be substantially canceled by the mirror capacitor MC.

Figure 15C:
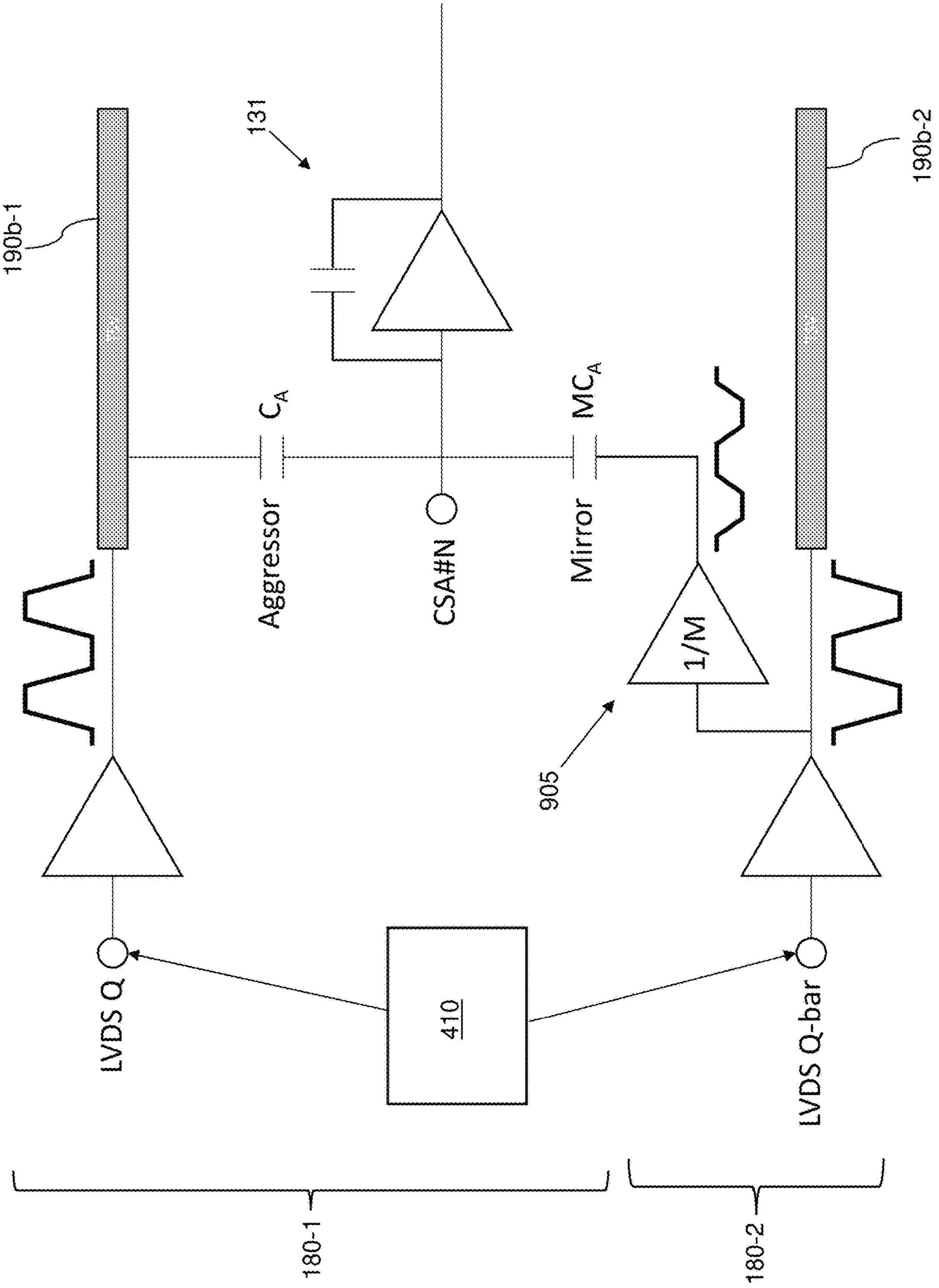
FIG. 15C is a circuit diagram schematically illustrating a method for adjusting the mirror capacitance to balance the parasitic capacitance in a unit cell of an ASIC according to an embodiment of the present disclosure.

In some cases, it may be difficult to fabricate a mirror capacitor MC that balances out the parasitic capacitance of a data transmission TSV 190*b* located within or proximate to a particular unit cell 180. In some cases, the capacitance of the mirror capacitor MC in a particular unit cell 180 may be greater than the parasitic capacitance (which may also be referred to as the "aggressor capacitance") experienced within that unit cell 180 by a factor, M. In various embodiments, the mirror capacitance may be balanced by attenuating the signal from the complementary data transmission TSV 190*b* to the mirror capacitor MC. FIG. 15C is a circuit diagram schematically illustrating a method for adjusting the mirror capacitance MC to balance the parasitic capacitance in a unit cell 180 of an ASIC 130. FIG. 15C illustrates complementary LVDS signals, Q and Q-bar, transmitted through first and second data transmission TSVs 190*b*-1 and 190*b*-2, respectively. The transmission of signal Q through the first data transmission TSV 190*b*-1 produces an aggressor capacitance, $C_A$, between the first data transmission TSV 190*b*-1 and the input node (CSA #N) to the amplifier 131 in the first unit cell 180-1. The first unit cell 180-1 includes a mirror capacitor electrically coupled to the second data transmission TSV 190*b*-2 to compensate for the aggressor capacitance, $C_A$. The capacitance of the mirror capacitor $MC_A$ is greater than the aggressor capacitance $C_A$ by a factor of M. An attenuation circuit 905 may be used to attenuate the magnitude of the complementary LVDS signal, Q-bar, that is transmitted to the mirror capacitor. By attenuating the Q-bar signal by a factor of 1/M, the aggressor capacitance and the mirror capacitance may be equalized.

The devices (e.g., ASICs and/or detector structures including the ASICs) may include the features of various embodiments (e.g., first through ninth embodiments) individually or any combination of two or more of such features. The devices of the embodiments of the present disclosure can be employed in various radiation detection systems including computed tomography (CT) imaging systems. Any direct conversion radiation sensors may be employed such as radiation sensors employing Si, Ge, GaAs, CdTe, CdZnTe, and/or other similar semiconductor materials.

The radiation detectors of the present embodiments may be used for medical imaging, such as in Low-Flux applications in Nuclear Medicine (NM), whether by Single Photon Emission Computed Tomography (SPECT) or by Positron Emission Tomography (PET), or as radiation detectors in High-Flux applications as in X-ray Computed Tomography (CT) for medical applications, and for non-medical imaging applications, such as in baggage security scanning and industrial inspection applications.

While the disclosure has been described in terms of specific embodiments, it is evident in view of the foregoing description that numerous alternatives, modifications and variations will be apparent to those skilled in the art. Each of the embodiments described herein can be implemented individually or in combination with any other embodiment unless expressly stated otherwise or clearly incompatible. Accordingly, the disclosure is intended to encompass all such alternatives, modifications and variations which fall within the scope and spirit of the disclosure and the following claims.

The invention claimed is:

1. A detector structure, comprising:

at least one radiation sensor comprising an array of pixel detectors; and an application specific integrated circuit (ASIC) comprising an array of unit cells, each unit cell comprising signal processing channel circuitry and a contact region on a front surface of the ASIC that is electrically coupled to a pixel detector of the array of pixel detectors, the ASIC comprising a first region comprising a first set of one or more unit cells, and a second region comprising a second set of one or more unit cells and least one data transmission through-substrate via (TSV), wherein at least one of:

a) the detector structure further comprises an underfill material that is located between the front surface of the ASIC and the at least one radiation sensor in the first region of the ASIC, and the underfill material is not present in the second region of the ASIC; or b) the first set of one or more unit cells comprise active unit cells and the second set of one or more unit cells comprise inactive unit cells.

2. The detector structure of claim 1, wherein the detector structure further comprises the underfill material that is located between the front surface of the ASIC and the at least one radiation sensor in the first region of the ASIC, and the underfill material is not present in the second region of the ASIC.

3. The detector structure of claim 1, wherein the first set of one or more unit cells comprise the active unit cells and the second set of one or more unit cells comprise the inactive unit cells.

4. The detector structure of claim 3, wherein the second region of the ASIC comprising the second set of one or more unit cells comprising the inactive unit cells is located in a central region of the detector structure.

5. The detector structure of claim 3, wherein the second region of the ASIC comprising the second set of one or more unit cells comprising the inactive unit cells is located in a corner region of the detector structure.

6. The detector structure of claim 1, wherein the second region of the ASIC comprises at least two data transmission TSVs that are configured to transmit photon count data from the ASIC to an external component via differential signaling.

7. The detector structure of claim 6, wherein the at least two data transmission TSVs are configured to transmit the photon count data from the ASIC to the external component via low voltage differential signaling (LVDS).

8. The detector structure of claim 6, wherein the signal processing channel circuitry in each of the unit cells comprises an amplifier coupled to the contact region of the unit cell, a shaper circuit block coupled to the amplifier, a discrimination circuit block coupled to the shaper circuit block, and a counter circuit block coupled to the shaper circuit block.

9. The detector structure of claim 1, wherein the at least one radiation sensor is bonded directly to the ASIC via a plurality of bonding material portions without an interposer located between the at least one radiation sensor and the ASIC.

10. An X-ray imaging system, comprising:

a radiation source configured to emit X-rays; and a detector array including a plurality of detector structures of claim 1 that form a continuous detector surface and that are configured to receive the X-rays from the radiation source through an intervening space configured to contain an object therein.

11. The X-ray imaging system of claim 10, wherein the X-ray imaging system comprises a photon-counting computerized tomography (PCCT) imaging system comprising an image reconstruction system including a computer configured to run an automated image reconstruction algorithm on event detection signals generated by the detector modules of the detector array.

* * * * *